US012562360B2

(12) United States Patent
Tsukamoto et al.

(10) Patent No.: US 12,562,360 B2
(45) Date of Patent: *Feb. 24, 2026

(54) MANUFACTURING METHOD OF ELECTRODE PLATE, MANUFACTURING METHOD OF SECONDARY BATTERY, ELECTRODE PLATE, AND SECONDARY BATTERY

(71) Applicant: PRIME PLANET ENERGY & SOLUTIONS, INC., Tokyo (JP)

(72) Inventors: Kentaro Tsukamoto, Kobe (JP); Yoshifumi Magari, Hirakata (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 752 days.

This patent is subject to a terminal disclaimer.

(21) Appl. No.: 17/860,183

(22) Filed: Jul. 8, 2022

(65) Prior Publication Data

US 2023/0042958 A1 Feb. 9, 2023

(30) Foreign Application Priority Data

Jul. 16, 2021 (JP) ................................. 2021-117994

(51) Int. Cl.
*H01M 4/04* (2006.01)
*B23K 26/0622* (2014.01)
(Continued)

(52) U.S. Cl.
CPC ........... *H01M 4/04* (2013.01); *B23K 26/0622* (2015.10); *B23K 26/38* (2013.01); *H01M 4/133* (2013.01);
(Continued)

(58) Field of Classification Search
None
See application file for complete search history.

(56) References Cited

U.S. PATENT DOCUMENTS

2010/0028767 A1 2/2010 Inose et al.
2013/0306608 A1 11/2013 Schaefer
(Continued)

FOREIGN PATENT DOCUMENTS

EP 4 037 008 A1 8/2022
EP 4 037 089 A1 8/2022
(Continued)

OTHER PUBLICATIONS

Zemaitis et al., Sci. Rep. 2018, 8, 17376 (Year: 2018).*
(Continued)

*Primary Examiner* — Jeffrey T Barton
(74) *Attorney, Agent, or Firm* — Finnegan, Henderson, Farabow, Garrett and Dunner, LLP

(57) ABSTRACT

According to the present disclosure, it is possible to inhibit the electrically conductive foreign substance from falling off and being peeled off from the electrode plate that has been already manufactured, so as to contribute in improving the safety property of the secondary battery. The manufacturing method of the electrode plate herein disclosed includes a precursor preparing step for preparing an electrode precursor 20A including an active material provided area A1 in which an electrode active material layer 24 is provided on a surface of the electrode core 22 and including a core exposed area A2 in which the electrode active material layer 24 is not provided and the electrode core 22 is exposed, and an active material provided area cutting step for cutting the active material provided area A1 by a pulse laser, and a core exposed area cutting step for cutting the core exposed area A2 by the pulse laser. Then, in the case where the pulse width (ns) of the pulse laser is represented by X and the lap rate (%) is represented by Y for the core exposed area cutting step, a condition represented by $Y \geq -3 \log X + 106$ is satisfied. According to the manufacturing method of the elec- (Continued)

trode plate as described above, it is possible to inhibit the electrically conductive foreign substance from falling off and being peeled off from the electrode plate that has been already manufactured, and thus it is possible to contribute in improving the safety property of the secondary battery.

8 Claims, 13 Drawing Sheets

(51) Int. Cl.

| | |
|---|---|
| *B23K 26/38* | (2014.01) |
| *H01M 4/133* | (2010.01) |
| *H01M 4/1393* | (2010.01) |
| *H01M 4/583* | (2010.01) |
| *H01M 4/66* | (2006.01) |
| *H01M 50/533* | (2021.01) |
| *B23K 101/36* | (2006.01) |
| *H01M 4/02* | (2006.01) |

(52) U.S. Cl.
CPC ......... *H01M 4/1393* (2013.01); *H01M 4/583* (2013.01); *H01M 4/662* (2013.01); *H01M 50/533* (2021.01); *B23K 2101/36* (2018.08); *H01M 2004/021* (2013.01); *H01M 2004/027* (2013.01)

(56) References Cited

U.S. PATENT DOCUMENTS

| | | | |
|---|---|---|---|
| 2016/0036009 A1 | 2/2016 | Cho et al. | |
| 2020/0212498 A1* | 7/2020 | Kitamura | .......... H01M 10/0525 |
| 2022/0109147 A1* | 4/2022 | Tamura | ................. H01M 4/463 |
| 2022/0393250 A1 | 12/2022 | Tsukamoto et al. | |
| 2023/0021118 A1 | 1/2023 | Tsukamoto et al. | |
| 2023/0042958 A1 | 2/2023 | Tsukamoto et al. | |

FOREIGN PATENT DOCUMENTS

| | | | |
|---|---|---|---|
| JP | S 64-052376 A | 2/1989 | |
| JP | 2004-310051 A | 11/2004 | |
| JP | 2007-014993 | 1/2007 | |
| JP | 2010-034009 | 2/2010 | |
| JP | 2012-221912 A | 11/2012 | |
| JP | 2014-504429 A | 2/2014 | |
| JP | 2015-139820 A | 8/2015 | |
| JP | 2016-033912 | 3/2016 | |
| JP | 2016-219327 A | 12/2016 | |
| JP | 2023-13654 A | 1/2023 | |
| JP | 2023-013655 A | 1/2023 | |
| KR | 10-2008-0101725 A | 11/2008 | |
| KR | 10-2016-0015013 A | 2/2016 | |
| WO | WO 2016-208686 A1 | 12/2016 | |
| WO | WO 2020/170598 A1 | 8/2020 | |
| WO | WO 2021/085202 A1 | 5/2021 | |

OTHER PUBLICATIONS

Non Final Office Action issued in U.S. Appl. No. 17/860,199, dated May 19, 2025.

Notice of Allowance issued in U.S. Appl. No. 17/860,199, dated Oct. 17, 2025.

* cited by examiner

MANUFACTURING METHOD OF ELECTRODE PLATE, MANUFACTURING METHOD OF SECONDARY BATTERY, ELECTRODE PLATE, AND SECONDARY BATTERY

CROSS REFERENCE TO RELATED APPLICATIONS

The present application claims the priority based on Japanese Patent Application No. 2021-117994 filed on Jul. 16, 2021, the entire contents of which are incorporated in the present specification by reference.

BACKGROUND

1. Technical Field

The present disclosure relates to a manufacturing method of an electrode plate, a manufacturing method of a secondary battery, an electrode plate, and a secondary battery.

2. Description of the Related Art

The secondary battery, such as a lithium ion secondary battery, includes an electrode body, for example, in which a positive electrode plate and a negative electrode plate are opposed to each other through a separator. Hereinafter, these positive electrode plate and negative electrode plate are collectively referred to as "electrode plate". This electrode plate includes, for example, an electrode core that is a foil-shaped metal member, and an electrode active material layer that is provided on the surface of the electrode core and contains an electrode active material. In manufacturing an electrode plate having the configuration as described above, firstly, the electrode active material layer is provided on the surface of a large-sized electrode core. By doing this, a precursor of the electrode plate (hereinafter, referred to as "electrode precursor") is manufactured. Then, by using a laser, or the like, a desired size of electrode plate is cut out from the electrode precursor. Examples of the technique related to cut out of the electrode plate are disclosed in JP2010-34009 and JP2016-33912.

The electrode precursor having the above described configuration tends to have the thickness of the electrode active material layer be nonuniform at the outer circumferential edge part of the area on which the electrode active material layer is provided (active material provided area). Thus, in order to cut out the electrode plate from the electrode precursor, normally, the outer circumferential edge part of the active material provided area is excised by the laser. Additionally, regarding a normal electrode plate, it is required to provide a portion in which the electrode core (metal foil) is exposed, in order to secure a connecting position to the electrically conductive member, such as an electrode terminal. Thus, for cutting out the electrode plate, a part of the area (core exposed area), in which the electrode active material layer is not provided and the base material for electrode core is exposed, is cut out so as to form the electrode tab. As described above, in manufacturing the electrode plate, a step for cutting the active material provided area and a step for cutting the core exposed area are performed (see, for example, JP2010-34009).

SUMMARY

However, the electrode plate manufactured by the above described manufacturing method includes a feature that a broken piece of the electrode active material layer or a fine metal piece (sputter) easily falls off or is peeled off. Then, if these electric conductive foreign substances fall off or are peeled off inside the secondary battery, it can be a cause of generating the internal short circuit.

The present disclosure has been made in view of the above described circumstances, and has a purpose of providing a technique for inhibiting the electrically conductive foreign substance from falling off or being peeled off from the electrode plate that has been already manufactured and thus for contributing in improving the safety property of the secondary battery.

The inventor has performed various studies in order to solve the above described circumstances. As the result, has found the causes respectively for generating the fall off or peel off of the broken piece of the electrode active material layer and for generating the fall off or peel off of the sputter.

At first, the cause of the broken piece of electrode active material layer falling off and being peeled off will be described. As just described above, in manufacturing the electrode plate, the outer circumferential edge part of the active material provided area is excised by the laser. At that time, it might happen that the electrode core melts by the heat due to the laser so as to be mixed with a part of the electrode active material layer. Then, the electrode active material layer mixed with that melt metal have the adhesive property greatly reduced so as to fall off and be peeled off easily by the slight impact. The inventor has thought that, for suppressing the reduction in the adhesive property of the electrode active material layer caused by contamination of this melt metal, the pulse laser would be used to cut the active material provided area. The pulse laser as described above can repeatedly perform the spot irradiation by the very short time interval, and thus it is possible to apply large energy on the cut portion in a concentrated manner. By doing this, it is possible to promptly cut the electrode core in a state that the melt amount is small.

Next, the cause of having the fine metal piece (sputter) falling off and being peeled off will be described. As just described above, in manufacturing the electrode plate, it is desired for forming the electrode tab to cut out a part of the core exposed area. However, if the high energy laser is irradiated to the portion on which the metal member is exposed, such as the core exposed area, the sputter could be scattered from the irradiated portion. Then, when this sputter is stuck on the electrode plate, it becomes a fine metal piece that easily falls off and is easily peeled off by the slight impact. The inventor has thought that, for suppressing this sputter from being scattered, the continuous wave laser (CW laser) would be used to cut the core exposed area. This CW laser is to continuously irradiate low energy laser so as to perform melt cutting on the electrode core. By doing this, it is possible, while suppressing the sputter from being scattered, to form the electrode tab.

As described above, the pulse laser should be used for cut the active material provided area, in order to inhibit the broken piece of the electrode active material layer from falling off. On the other hands, the CW laser should be used for cut the core exposed area, in order to inhibit the sputter from falling off. However, a method in which the laser to be used is switched so as to individually cut the active material provided area and the core exposed area would cause drastic reduction in the manufacture efficiency. Thus it is hard to adopt this method in the real manufacturing case. In addition, if the active material provided area and the core exposed area are individually cut, it is required to connect the cut lines formed on respective areas without deviation.

In this case, the cut failure is caused frequent occurrence. In consideration of the circumstance as described above, the inventor has studied about a method that not only can inhibit generations of both of 2 kinds of electrically conductive foreign substances described above, but also can continuously cut the active material provided area and the core exposed area.

The manufacturing method of an electrode plate herein disclosed is made on the basis of the above described knowledge and is to manufacture the electrode plate that includes an electrode core being a metal foil and an electrode active material layer being provided on a surface of the electrode core and containing an electrode active material. Then, the manufacturing method of the electrode plate as described above includes a precursor preparing step for preparing an electrode precursor that includes an active material provided area in which an electrode active material layer is provided on a surface of an electrode core and that includes a core exposed area in which an electrode core is exposed while an electrode active material layer is not provided, includes an active material provided area cutting step for cutting an active material provided area by a pulse laser, and includes a core exposed area cutting step for cutting a core exposed area by a pulse laser. Then, in the manufacturing method of the electrode plate herein disclosed, a pulse width (ns) and a lap rate (%) of a pulse laser for a core exposed area cutting step are respectively represented by X and Y, and a formula (1) of $Y \geq -3 \log X + 106$ is satisfied.

The manufacturing method of the electrode plate having the above described configuration uses the pulse laser for cutting the active material provided area. By doing this, it is possible to suppress the melt metal, which is derived from the electrode core, from contaminating the electrode active material layer. Thus, it is possible to inhibit the broken piece of the electrode active material layer from falling off and being peeled off from the electrode plate that has been already manufactured. On the other hand, the herein disclosed manufacturing method uses the pulse laser even for cutting the core exposed area, so as to continuously cut the active material provided area and the core exposed area. Thus, it is possible to inhibit drastic reduction in the manufacture efficiency or to inhibit the generation of the cut failure. Here, in the herein disclosed manufacturing method, the state of the pulse laser for cutting the core exposed area is made to approximate the CW laser. Particularly, in the experiment performed by the inventor, the pulse laser satisfying the above described Formula (1) can increase the melt amount of the electrode core to a level similar to the CW laser. By doing this, it is possible to perform melt cutting on the electrode core so as to suppress the scatter of the sputter. As just described above, according to the manufacturing method of the electrode plate herein disclosed, it is possible to inhibit the electrically conductive foreign substance from falling off and being peeled off from the electrode plate that has been already manufactured, and thus it is possible to contribute in improving the safety property of the secondary battery.

Additionally, in a suitable aspect of the manufacturing method of the electrode plate herein disclosed, a frequency of a pulse laser in an active material provided area cutting step is smaller than a frequency of a pulse laser in a core exposed area cutting step. By doing this, it is possible to more properly inhibit the broken piece of the electrode active material layer and the sputter from falling off and being peeled off.

Additionally, in a suitable aspect of the manufacturing method of the electrode plate herein disclosed, a frequency of a pulse laser in an active material provided area cutting step is 100 kHz to 2000 kHz. By doing this, it is possible to more properly inhibit the broken piece of the electrode active material layer from falling off and being peeled off.

Additionally, in a suitable aspect of the manufacturing method of the electrode plate herein disclosed, a pulse width X of a pulse laser in a core exposed area cutting step is 30 ns to 240 ns. By doing this, it is possible to more suitably inhibit the sputter from falling off and being peeled off.

Additionally, in a suitable aspect of the manufacturing method of the electrode plate herein disclosed, a lap rate of a pulse laser in an active material provided area cutting step is smaller than a lap rate of a pulse laser in a core exposed area cutting step. By doing this, it is possible to more properly inhibit the broken piece of the electrode active material layer and the sputter from falling off and being peeled off.

Additionally, in a suitable aspect of the manufacturing method of the electrode plate herein disclosed, a lap rate of a pulse laser in a core exposed area cutting step is 90% to 99%. By doing this, it is possible to more suitably inhibit the sputter from falling off and being peeled off.

Additionally, in a suitable aspect of the manufacturing method of the electrode plate herein disclosed, an electrode plate is a negative electrode plate that includes a negative electrode core made of a copper or a copper alloy, and a negative electrode active material layer including a carbon material as an electrode active material. In the negative electrode plate having the configuration as described above, it particularly tends to easily occur the reduction in the adhesive property of the electrode active material layer caused by the contamination of the melt metal. However, according to the manufacturing method of the electrode plate herein disclosed, it is possible to properly suppress the reduction in the adhesive property of the electrode active material layer even for the manufacture of the negative electrode plate having the configuration as described above.

As another aspect of the herein disclosed technique, a manufacturing method of a secondary battery is provided. Particularly, the herein disclosed technique relates to a manufacturing method of a secondary battery for manufacturing a secondary battery provided with an electrode body in which a pair of electrode plates are opposed to each other through a separator, and the manufacturing method of the electrode plate having the above described configuration is used to manufacture at least one of the pair of electrode plates. According to the manufacturing method as described above, it is possible to suppress the electrically conductive foreign substance (broken piece of the electrode active material layer and sputter) from falling off and being peeled off from the electrode plate inside the secondary battery, and thus it is possible to obtain the secondary battery whose safety property is outstanding.

In addition, as another aspect of the herein disclosed technique, an electrode plate is provided. The electrode plate as described above includes an electrode core being a foil-shaped metal member and an electrode active material layer provided on a surface of an electrode core and containing an electrode active material. Then, this electrode plate includes an electrode plate main body part in which an electrode active material layer is provided on a surface of an electrode core, and an electrode tab that is an area in which an electrode active material layer is not provided and an electrode core is exposed and that protrudes toward an outside from one part of an outer circumferential edge part of an electrode plate main body part. Then, in the herein disclosed electrode plate, at an outer circumferential edge part of an electrode tab, a first thick part is formed whose thickness is larger than a central part of an electrode tab, and an aspect ratio of a first thick part in a cross section view along a thickness direction of an electrode tab is equal to or more than 0.85. Furthermore, at an end part of an electrode core in at least one side of an outer circumferential edge part of an electrode plate main body part, a second thick part is formed whose thickness is larger than an electrode core at a central part of an electrode plate main body part, and a surface of a second thick part is stuck with a coating layer containing an electrode active material.

The herein disclosed electrode plate has been manufactured by the manufacturing method of the electrode plate having the above described configuration. In particular, on this electrode plate, the first thick part is formed at the outer circumferential edge part of the electrode tab. The first thick part as described above is a trace mark on which the laser cut has being performed. Then, in the manufacturing method of the electrode plate having the above described configuration, the condition of the pulse laser is made to approximate the CW laser at the time of cutting out (cutting the core exposed area) the electrode tab. When the melt cutting is performed with the pulse laser as described above, the melt amount of the electrode core becomes at a level similar to the CW laser, and thus the cross sectional shape of the cut trace (first thick part) becomes an approximately round (aspect ratio is equal to or more than 0.85). On the other hand, in the manufacturing method of the electrode plate having the above described configuration, the reduction in the adhesive property of the electrode active material layer caused by the contamination of the melt metal is suppressed at the time of cutting out the electrode plate main body part (cutting the active material provided area), and thus the high energy pulse laser is used. Therefore, the coating layer containing the electrode active material is stuck at the laser cut trace (second thick part) formed at the outer circumferential edge part of the electrode plate main body part. The coating layer as described above becomes different from the electrode active material layer in which the melt metal is contaminated, and thus is hardly peeled off and hardly falls off from the electrode core.

In addition, in a suitable aspect of the herein disclosed electrode plate, the second thick part has a claw hook shape including a shade part that protrudes at the both sides or one side in a thickness direction and including a recessed part that is formed between the shade part and an electrode core. As just described above, the second thick part is a laser cut trace formed by a high energy pulse laser. By using the high energy pulse laser, the metal melt amount during cutting becomes very small, and thus it happens to form a cut trace (second thick part) having the claw hook shape as described above. The second thick part having the claw hook shape induces the outstanding anchor effect, and thus it is possible to further suitably inhibit the fall off and peel off of the electrode active material layer.

In addition, in a suitable aspect of the herein disclosed electrode plate, a thickness of a coating layer stuck on a surface of a second thick part is 1 μm to 20 μm. By doing this, it is possible to make the coating layer of the electrode active material properly cover the second thick part, and thus it is possible to suitably inhibit the second thick part from causing damage on another member (for example, separator of the secondary battery).

In addition, in a suitable aspect of the herein disclosed electrode plate, a center point of a first thick part is arranged between a pair of extended lines extending from respective surfaces of a central part of an electrode tab. The bending process on the electrode tab is easy for the electrode plate having the configuration as described above, and thus it is possible to contribute in enhancing the manufacture efficiency of the secondary battery. This kind of first thick part can be formed by cutting out the electrode tab with the pulse laser satisfying the above-described Formula (1).

Additionally, in a suitable aspect of the herein disclosed electrode plate, a first thick part includes a first area whose thickness is relatively large and a second area whose thickness is relatively small, and a first area and a second area are alternately formed along an outer circumferential edge part of an electrode tab. The manufacturing method of the electrode plate having the above-described configuration uses the pulse laser satisfying Formula (1) and having the high lap rate to perform melt cutting on the electrode core (negative electrode tab). In that case, the melted electrode core is deformed into an approximately spherical shape by the surface tension, and thus the first area being the melt metal dense portion and the second area being the melt metal sparse portion are alternately formed.

As another aspect of the herein disclosed technique, a secondary battery can be provided. Particularly, regarding the herein disclosed technique, the secondary battery provided with an electrode body in which plates among a pair of electrode plates are opposed through a separator is characterized by using the electrode plate having the above described configuration for at least one among the pair of electrode plates. By doing this, it is possible to suppress the electrically conductive foreign substance (broken piece of the electrode active material layer, or sputter) from being separated from the electrode plate, and thus it is possible to contribute in improving the safety property of the secondary battery.

DETAILED DESCRIPTION

Below, while referring to drawings, an embodiment of the herein disclosed technique is explained. Incidentally, the matters other than matters particularly mentioned in this specification, and required for practicing the present disclosure (for example, a general configuration and manufacture process of the battery) can be grasped as design matters of those skilled in the art based on the conventional technique in the present field. The herein disclosed technique can be executed based on the contents disclosed in the present specification, and on the technical common sense in the present field. Incidentally, the wording "A to B" representing a range means a content equal to or more than A and not more than B, and further semantically covers meanings "preferably more than A" and "preferably less than B".

Incidentally, in the present specification, the wording "secondary battery" represents an electric storage device in general that generates electrically charging and discharging reaction by the electric charge carrier moving between a pair of electrodes (positive electrode and negative electrode) through an electrolyte. The secondary battery as described above semantically covers a so-called storage battery, such as lithium ion secondary battery, nickel hydrogen battery, and nickel cadmium battery, and further covers a capacitor, such as electric double layer capacitor, and the like. Hereinafter, an embodiment in a case where the object is the lithium ion secondary battery among the above described secondary battery will be described.

<Manufacturing Method of Electrode Plate>

Figure 1:
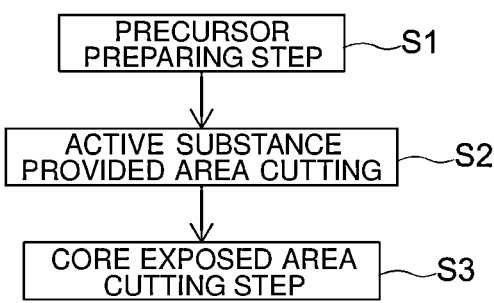
FIG. 1 is a flow chart that shows a manufacturing method of an electrode plate in accordance with one embodiment.
Figure 2:
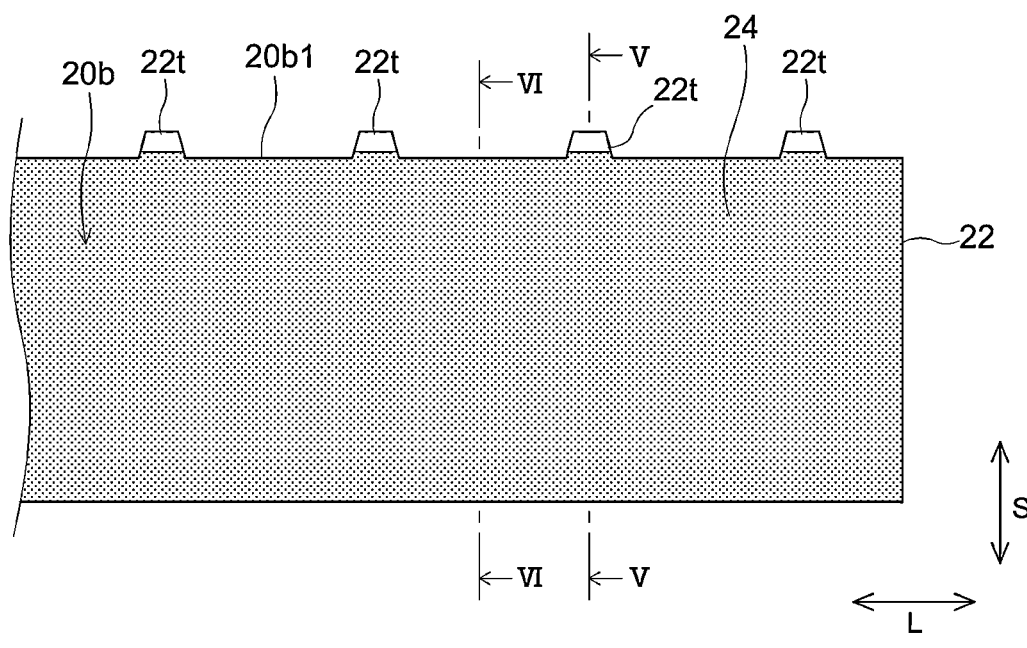
FIG. 2 is a plane view that schematically shows a negative electrode plate manufactured by the manufacturing method of the electrode plate in accordance with one embodiment.
Figure 3:
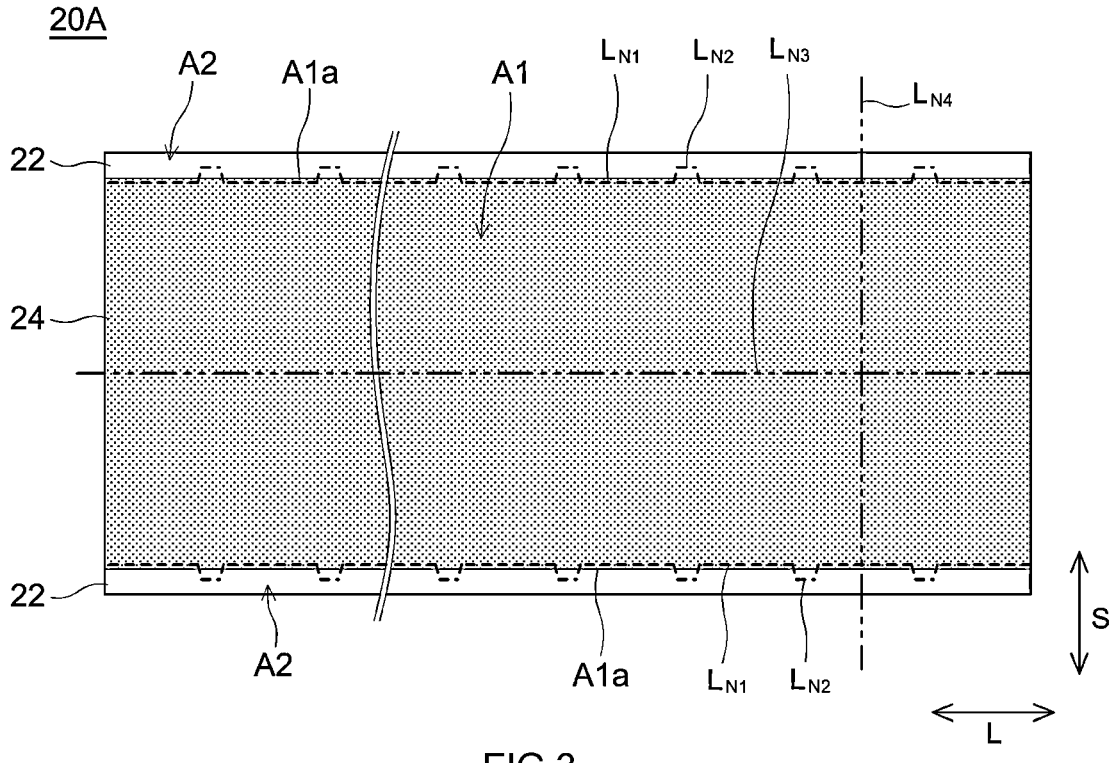
FIG. 3 is a plane view for explaining the manufacturing method of the electrode plate in accordance with one embodiment.
Figure 4:
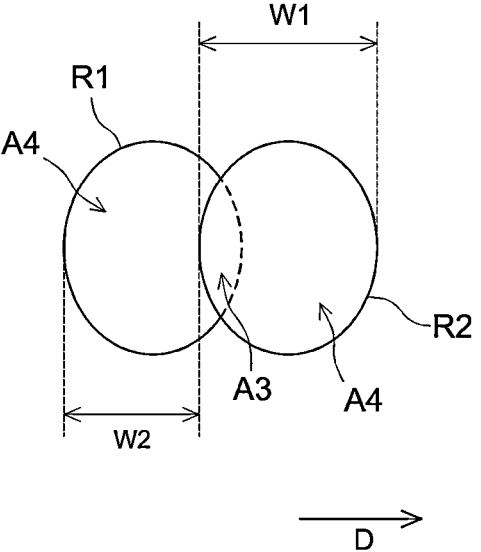
FIG. 4 is a view for explaining a lap rate of a pulse laser.
Figure 5:
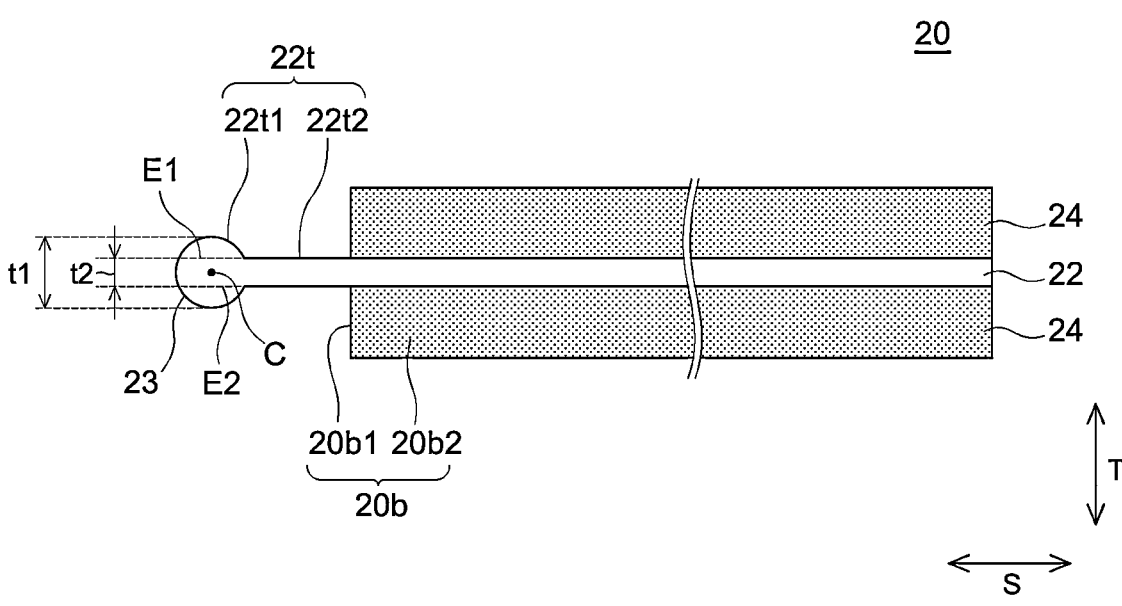
FIG. 5 is a cross sectional view that is shown from the V-V direction of FIG. 2.
Figure 6:
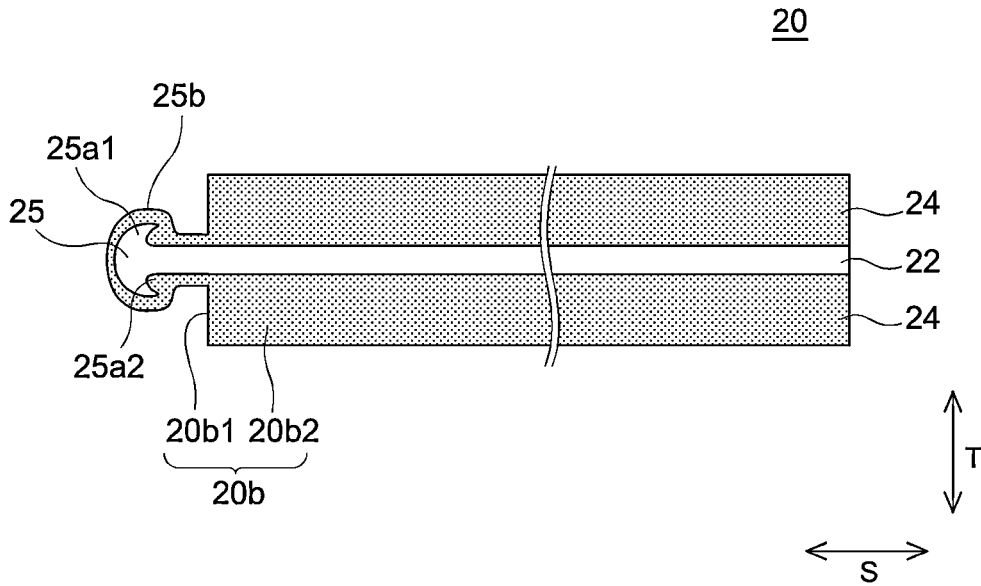
FIG. 6 is a cross sectional view that is shown from the VI-VI direction of FIG. 2.

The manufacturing method of the electrode plate herein disclosed is a method for manufacturing an electrode plate that includes an electrode core being a metal foil, and an electrode active material layer being provided on the surface of the electrode core and including an electrode active material. Below, as one embodiment for the manufacturing method of the electrode plate herein disclosed, it will explain about a method for manufacturing an electrode plate (negative electrode plate) at a negative electrode side of a secondary battery. FIG. 1 is a flow chart that shows the manufacturing method of the electrode plate in accordance with the present embodiment. FIG. 2 is a plane view that schematically shows the negative electrode plate manufactured by the manufacturing method of the electrode plate in accordance with the present embodiment. FIG. 3 is a plane view for explaining the manufacturing method of the electrode plate in accordance with the present embodiment. In addition, FIG. 4 is a view for explaining a lap rate of a pulse laser. FIG. 5 is a cross sectional view that is shown from the V-V direction of FIG. 2. In addition, FIG. 6 is a cross sectional view that is shown from the VI-VI direction of FIG. 2. Incidentally, in FIGS. 2, 3, 5, and 6, the reference sign L represents the "longitudinal direction" of the negative electrode plate 20 (or negative electrode precursor 20A), the reference sign S represents the "short-transverse direction", and the reference sign T represents the "thickness direction".

As shown in FIG. 1, the manufacturing method of the electrode plate in accordance with the present embodiment includes a precursor preparing step S1, an active material provided area cutting step S2, and a core exposed area cutting step S3. By doing this, the negative electrode plate 20 whose configuration is shown in FIG. 2 is manufactured. Below, it will explain about an overview of the negative electrode plate 20 being the manufacture target, and then explain about each step shown in FIG. 1.

(Overview of Negative Electrode Plate)

As shown in FIG. 2, the negative electrode plate 20 is a long strip-like shaped member. The negative electrode plate 20 includes a negative electrode core 22 that is a foil-shaped metal member, and includes a negative electrode active material layer 24 that is provided on the surface of the negative electrode core 22. Incidentally, it is preferable from the perspective of the battery performance that the negative electrode active material layer 24 is provided on both surfaces of the negative electrode core 22. Then, this negative electrode plate 20 in a plane view includes two areas being an electrode plate main body part 20b and a negative electrode tab 22t. The electrode plate main body part 20b is an area where a negative electrode active material layer 24 is provided on the surface of the negative electrode core 22. On the other hand, the negative electrode tab 22t is an area where the negative electrode core 22 is exposed as the negative electrode active material layer 24 is not provided. In addition, the negative electrode tab 22t protrudes from one part of an outer circumferential edge part 20b1 of the electrode plate main body part 20b to the outside (upward in the short-transverse direction S in FIG. 2). In addition, the negative electrode plate 20 shown in FIG. 2 includes a plurality of negative electrode tabs 22t. The plurality of these negative electrode tabs 22t are provided away from each other by a predetermined distance in the longitudinal direction L of the negative electrode plate 20.

As for each of members configuring the negative electrode plate 20, a material used in a conventional and general secondary battery can be used without particular restriction. For example, a metal material having a predetermined electric conductive property can be preferably used for the negative electrode core 22. It is preferable that the negative electrode core 22 as described above is made of, for example, copper or copper alloy. In addition, regarding the thickness of the negative electrode core 22, 2 μm to 30 μm is preferable, 3 μm to 20 μm is more preferable, and 5 μm to 15 μm is furthermore preferable.

The negative electrode active material layer 24 is a layer containing a negative electrode active material. As the negative electrode active material, a material capable of reversibly storing and emitting an electric charge carrier can be used, in consideration of the relation with the positive electrode active material. For the negative electrode active material as described above, it is possible to use a carbon material, a silicon type material, or the like. As the carbon material, for example, it is possible to use a graphite, a hard carbon, a soft carbon, an amorphous carbon, or the like. In addition, it is possible to use an amorphous carbon covered graphite in which the surface of the graphite is covered by the amorphous carbon. On the other hand, as the silicon type material, it is possible to use a silicon, a silicon oxide (silica), or the like. In addition, the silicon type material might contain another metal element (e.g., alkaline earth metal) or its oxide. In addition, the negative electrode active material layer 24 might contain an additive agent other than the negative electrode active material. For one example of the additive agent as described above, it is possible to use a binder, a thickening agent, or the like. As for a specific example of the binder, it is possible to use a rubber type binder, such as styrene butadiene rubber (SBR). In addition, as for a specific example of the thickening agent, it is possible to use carboxy methyl cellulose (CMC), or the like. Incidentally, in the case where the whole solid content of the negative electrode active material layer 24 is treated as 100 mass %, the content amount of the negative electrode active material is approximately equal to or more than 30 mass %, or typically equal to or more than 50 mass %. Incidentally, the negative electrode active material might occupy 80 mass % or more of the negative electrode active material layer 24, or might occupy 90 mass % or more of it. In addition, regarding the thickness of the negative electrode active material layer 24, 10 μm to 500 μm is preferable, 30 μm to 400 μm is more preferable, and 50 μm to 300 μm is furthermore preferable.

The negative electrode plate 20 having the above described configuration is, as shown in FIG. 1, manufactured by performing the precursor preparing step S1, the active material provided area cutting step S2, and the core exposed area cutting step S3. Below, each of steps will be described.

(Precursor Preparing Step S1)

The present step is to prepare an electrode precursor that is a precursor of the electrode plate. The electrode precursor shown in FIG. 3 is a precursor of the negative electrode plate (negative electrode precursor 20A). This negative electrode precursor 20A includes a negative electrode core 22 that is a metal foil formed in a strip-like shape. The area of the negative electrode core 22 of the negative electrode precursor 20A is larger than the area of the negative electrode plate 20 that has been already manufactured (see FIG. 2). Then, on the surface of the negative electrode core 22, the negative electrode active material layer 24 is provided. Incidentally, the negative electrode active material layer 24 is provided at the central part of the negative electrode core 22 in the short-transverse direction S to extend along the longitudinal direction L. In the present specification, the area where this negative electrode active material layer 24 is provided is referred to as "negative electrode active material provided area A1". On the other hand, the both side edge parts of the negative electrode precursor 20A (area outside the negative electrode active material layer 24 in the short-transverse direction S) fails to be provided with the negative electrode active material layer 24 and thus has the negative electrode core 22 being exposed. In the present specification, the area in which the negative electrode core 22 is exposed as described above is referred to as "negative electrode core exposed area A2". The means for preparing the negative electrode precursor 20A having the above described configuration is not particularly restricted, and conventionally well known various methods can be adopted without particular restriction. For example, a raw material paste containing the negative electrode active material and the like is coated on the surface of the negative electrode core 22 and then dried, so as to implement manufacturing the negative electrode precursor 20A. In addition, the present step is not particularly restricted if it is possible to prepare the negative electrode precursor 20A. For example, it is possible to purchase the negative electrode precursor 20A that has been independently manufactured, so as to perform the preparation. Incidentally, the negative electrode precursor is not restricted to the structure shown in FIG. 2. For example, regarding the negative electrode precursor, it is possible to adopt a structure in which the negative electrode core exposed area is formed at only one of the side edge parts.

(Active Material Provided Area Cutting Step S2)

The present step is to cut the negative electrode active material provided area A1 of the negative electrode precursor 20A by the pulse laser. Particularly, in the active material provided area cutting step S2, the pulse laser is allowed to scan on the negative electrode active material provided area A1 along the side edge parts A1a of the negative electrode active material provided area A1, as shown by dotted lines $L_{N1}$ in FIG. 3. By doing this, it is possible to excise the side edge parts A1a of the negative electrode active material provided area A1 whose thickness of the negative electrode active material layer 24 is nonuniform, so as to implement manufacturing the negative electrode plate 20 whose thickness of the negative electrode active material layer 24 is uniform. Here, when the negative electrode active material provided area A1 is cut by the laser as shown by the above described dotted lines $L_{N1}$, there is a possibility that a part of the negative electrode core 22 melted by the heat of the laser contaminates the negative electrode active material layer 24. Then, if the melt metal as described above is solidified in the negative electrode active material layer 24, the adhesive property of the negative electrode active material layer 24 is drastically lost, and thus there is a risk that the broken piece of the negative electrode active material layer 24 easily falls off or is easily peeled off by the slight impact. At the active material provided area cutting step S2 in the present embodiment, in order to inhibit the reduction in the adhesive property caused by the contamination of the melt metal as described above, the pulse laser is used for cutting the negative electrode active material provided area A1. Using the pulse laser as described above can implement adding large energy by a short time interval in a concentrated manner (peak output is high), and thus it is possible to promptly cut the negative electrode core 22 in a state that the melt amount is small. By doing this, it is possible to suppress the reduction in the adhesive property of the negative electrode active material layer 24 caused by the contamination of the melt metal, and thus it is possible to inhibit the broken piece of the negative electrode active material layer 24 from falling off or being peeled off.

Incidentally, the condition for the pulse laser in the active material provided area cutting step S2 is not particularly restricted, and thus it is preferable that the condition is appropriately adjusted in accordance with the structure of the negative electrode precursor 20A (typically, the thickness or material of the negative electrode active material layer 24 or negative electrode core 22). For example, regarding the average output of the pulse laser at the present step, 70 W to 1000 W is preferable, 100 W to 900 W is more preferable, and 150 W to 800 W is furthermore preferable. By doing this, it is possible, while inhibiting the negative electrode active material layer 24 from falling off and being peeled off, to easily cut the negative electrode precursor 20A. In particular, as the average output of the pulse laser becomes larger, cutting the negative electrode precursor 20A tends to become easier. On the other hand, the impact at the laser irradiation time becomes smaller as the average output of the pulse laser becomes smaller, and thus it is possible to inhibit a part of the negative electrode active material layer 24 from being blown off due to the impact of the laser.

In addition, regarding the repetition frequency of the pulse laser in the active material provided area cutting step S2, 100 KHz to 2000 KHz is preferable, 150 KHz to 1500 KHz is more preferable, and 200 KHz to 1000 KHz is furthermore preferable. By doing this, it is possible, while inhibiting the melted negative electrode core 22 from contaminating the negative electrode active material layer 24, to easily cut the negative electrode precursor 20A. Particularly, the peak output becomes larger in the case where the frequency of the pulse laser is smaller, and thus it facilitates cutting the negative electrode core 22. On the other hand, the peak output becomes smaller in the case where the frequency of the pulse laser is larger, and thus it is possible to inhibit a part of the negative electrode active material layer 24 provided with the laser irradiation from being blown off. In addition, regarding the spot diameter of the pulse laser in the active material provided area cutting step S2, 10 μm to 60 μm is preferable, 20 μm to 50 μm is more preferable, and 25 μm to 40 μm is furthermore preferable. By doing this, it is possible to easily cut out the negative electrode plate 20 from the negative electrode precursor 20A.

Furthermore, it is preferable that the lap rate of the pulse laser in the active material provided area cutting step S2 is smaller than the lap rate of the pulse laser in the core exposed area cutting step S3 described later. As the lap rate of the pulse laser is made to be smaller, cutting the negative electrode core 22 tends to become easier in a state that the melt amount is smaller. On the other hand, the state of the pulse laser becomes closer to the CW laser as the lap rate is made to be larger, and thus the occurrence of sputter described later tends to be easily suppressed. Thus, in the active material provided area cutting step S2 in which a problem about the contamination of the melted negative electrode core 22 tends to occur, it is preferable to use a pulse laser whose lap rate is smaller. Regarding the particular lap rate of the pulse laser in the active material provided area cutting step S2, 40% to 95% is preferable, 50% to 90% is more preferable, and 70% to 90% is furthermore preferable.

Next, regarding the scanning speed of the pulse laser in the active material provided area cutting step S2, 5000 mm/sec or less is preferable, and 3000 mm/sec or less is further preferable. Making the scanning speed be slower as described above can suppress the cut failure of the negative electrode core 22. On the other hand, the lower limit value of the scanning speed of the pulse laser is not particularly restricted, and the lower limit value might be equal to or more than 20 mm/sec. Incidentally, from the perspective of enhancing the manufacture efficiency due to shortening of cutting time, regarding the lower limit value of the scanning speed of the pulse laser, 200 mm/sec or more is preferable, and 500 mm/sec or more is further preferable. In addition, regarding the pulse width of the pulse laser in the active material provided area cutting step S2, 30 ns to 240 ns is preferable, and 60 ns to 120 ns is more preferable. By doing this, it is possible to suitably inhibit the melted negative electrode core 22 from contaminating the negative electrode active material layer 24. In particular, the peak output tends to be enhanced better as the pulse width of the pulse laser becomes shorter, and thus it can facilitate decreasing the melt amount of the negative electrode core 22 at the laser cutting time. On the other hand, the impact added to the negative electrode active material layer 24 becomes smaller as the pulse width becomes longer, and thus it can inhibit a part of the negative electrode active material layer 24 from being blown off at the laser irradiation time.

(Core Exposed Area Cutting Step S3)

The present step is to cut the negative electrode core exposed area A2 of the negative electrode precursor 20A by the pulse laser. In particular, in the core exposed area cutting step S3, firstly, the pulse laser is allowed to scan from the negative electrode active material provided area A1 toward the negative electrode core exposed area A2 along the short-transverse direction S of the negative electrode precursor 20A, as shown by the dotted lines $L_{N2}$ in FIG. 3. Then, the pulse laser is allowed to scan for a predetermined distance along the longitudinal direction L of the negative electrode precursor 20A, and after that, the pulse laser is allowed to scan along the short-transverse direction S toward the negative electrode active material provided area A1, again. By doing this, a part of the negative electrode core exposed area A2 is cut out to be in a convex shape so as to form the negative electrode tab 22t (see FIG. 2). Then, in the present embodiment, the active material provided area cutting step S2 (dotted line $L_{N1}$ of FIG. 3) and the core exposed area cutting step S3 (dotted line $L_{N2}$ of FIG. 3) are repeated by every constant period. By doing this, it is possible to excise the side edge part A1a of the negative electrode active material provided area A1 and further to cut out a plurality of negative electrode tab 22t.

Here, in the manufacturing method of the electrode plate according to the present embodiment, the pulse laser irradiated on the negative electrode core exposed area A2 in the core exposed area cutting step S3 is controlled to satisfy the below described Formula (1). In the below described Formula (1), "X" represents the pulse width (ns) of the pulse laser and "Y" represents the lap rate (%) of the pulse laser.

$$Y \geq -3 \log X + 106 \tag{1}$$

In the manufacturing method according to the present embodiment, the pulse laser satisfying the above described Formula (1) is used to cut the negative electrode core exposed area A2. By doing this, even though the pulse laser is used, it is possible to perform melt cutting on the negative electrode core exposed area A2 as if the CW laser is used, and thus scattering of the sputter can be suppressed. In particular, the laser irradiation becomes closer to continuous irradiation as the lap rate of the pulse laser becomes larger, and thus the sputter tends to hardly occur. On the other hand, the frequency of the sputter occurrence at the time of irradiating the pulse laser on the metal member is affected not only by the size of the lap rate but also by the length of the pulse width. In particular, the heat affecting time applied to the metal member becomes longer and the melt part is expanded further as the pulse width of the pulse laser becomes longer, and thus the sputter tends to occur hardly. In other words, for cutting the negative electrode core exposed area A2 by using the pulse laser, it is preferable to make the lap rate be larger and to make the pulse width be longer. By doing this, it is possible to make the state of the pulse laser be closer to the CW laser so as to implement suppressing the occurrence of the sputter. The above described Formula (1) represents an irradiation condition of the pulse laser (relation between the lap rate and the pulse width) that can sufficiently suppress the occurrence of the sputter, which is found by the inventor as the result of repeated experiments based on the knowledge described above (see FIG. 21).

Incidentally, as shown in FIG. 4, regarding the laser cut with the pulse laser, the irradiation is performed while a plurality of spots R1, R2 are shifted little by little in a predetermined scanning direction D. By doing this, an overlap irradiation area A3 is generated in which the adjacent spots R1, R2 are irradiated in an overlapped manner and a single irradiation area A4 is generated in which the single of spots R1, R2 is irradiated. In the present specification, the "lap rate" is a value representing a degree at which the adjacent spots R1, R2 are overlapped in the irradiation of the pulse laser as described above. The lap rate Y as described above can be obtained on the basis of the below described Formula (2) in the case where the spot diameter is represented as W1 and the irradiation distance between the adjacent spots is represented as W2. Incidentally, any of the above described spot diameter W1 and the irradiation distance W2 is a length in a direction along the scanning direction D of the pulse laser. That is to say, in the case where oval spots R1, R2 as shown in FIG. 4 are irradiated, the spot diameter W1 means a diameter for the spots R1, R2 along the scanning direction D. Additionally, in the case where the oval spots are irradiated, each spot might be tilted with respect to the scanning direction D. Even in that case, the lengths along the scanning direction D are measured as the spot diameter W1 and irradiation distance W2 of each spot. Incidentally, regarding the particular spot diameter W1 of the pulse laser in the core exposed area cutting step S3, 10 μm to 60 μm is preferable, 20 μm to 50 μm is more preferable, and 25 μm to 40 μm is furthermore preferable.

$$\text{Lap rate } Y(\%)=(W1-W2)/W1\times100 \tag{2}$$

As just described above, in the manufacturing method according to the present embodiment, various conditions are adjusted to make the lap rate Y of the pulse laser in the core exposed area cutting step S3 satisfy the condition equal to or more than $-3 \log X+106$. By doing this, it is possible to suppress the scattering of the sputter at the time of cutting the negative electrode core exposed area A2. At that time, as the above described lap rate Y becomes larger, it is possible to furthermore suitably suppress the scattering of the sputter. From the perspective as described above, it is further preferable that the pulse laser in the core exposed area cutting step S3 is controlled to make the lap rate Y be equal to or more than $-3 \log X+107$. On the other hand, the upper limit of the lap rate Y of the pulse laser in the core exposed area cutting step S3 is not particularly restricted, and might be equal to or less than 99%. However, it further facilitates rising the scanning speed of the pulse laser as the lap rate Y becomes smaller, and thus it tends to enhance the manufacture efficiency. From the perspective as described above, it is preferable that the pulse laser in the core exposed area cutting step S3 is controlled to make the lap rate Y be equal to or less than $-3 \log X+109$ (further suitably, equal to or less than $-3 \log X+108$).

Incidentally, it is enough that the pulse laser in the core exposed area cutting step S3 satisfies the above described Formula (1), and thus the pulse laser in the core exposed area cutting step S3 is not particularly restricted by the other conditions. For example, it is preferable that the other condition for the pulse laser in the core exposed area cutting step S3 is appropriately adjusted on the basis of the structure of the negative electrode core exposed area A2 (typically, the thickness or material of the negative electrode core 22). For example, the pulse width X configuring the above described Formula (1) might be 10 ns to 300 ns, might be 30 ns to 240 ns, or might be 120 ns to 240 ns. As shown in Formula (1) and FIG. 21, in the core exposed area cutting step S3, it is desired to make the lap rate Y be larger as the pulse width X is made to be smaller.

In addition, the average output of the pulse laser in the core exposed area cutting step S3 might be 70 W to 2000 W, might be 100 W to 1800 W, or might be 200 W to 1500 W. Cutting the negative electrode core exposed area A2 tends to become easier as the average output of the pulse laser becomes larger. On the other hand, the impact at the laser irradiation time becomes smaller as the average output of the pulse laser becomes smaller, and thus the scattering of the sputter tends to hardly occur.

In addition, the repetition frequency of the pulse laser in the core exposed area cutting step S3 might be 400 KHz to 4000 KHz, might be 1000 KHz to 3500 KHz, or might be 2000 KHz to 3000 KHz. The peak output becomes larger as the frequency of the pulse laser becomes smaller, and thus cutting the negative electrode core 22 tends to become easier. On the other hand, the scattering of the sputter tends to occur more hardly as the frequency of the pulse laser becomes larger.

Next, regarding the scanning speed of the pulse laser in the core exposed area cutting step S3, 5000 mm/sec or less is preferable, and 3000 mm/sec or less is further preferable. The cut failure of the negative electrode core 22 tends to occur more hardly as the scanning speed is made to be slower. On the other hand, the lower limit value of the scanning speed of the pulse laser is not particularly restricted, and the lower limit value might be equal to or more than 20 mm/sec. Incidentally, from the perspective of enhancing the manufacture efficiency by shortening the cutting time, regarding the lower limit value of the scanning speed of the pulse laser, 200 mm/sec or more is preferable, and 500 mm/sec or more is further preferable. Incidentally, the scanning speeds of the pulse laser in the active material provided area cutting step S2 and in the core exposed area cutting step S3 might be similar to each other.

(Another Step)

As just described above, in the manufacturing method according to the present embodiment, repeating the active material provided area cutting step S2 (dotted lines $L_{N1}$ of FIG. 3) and the core exposed area cutting step S3 (dotted lines $L_{N2}$ of FIG. 3) by every constant period can excise the side edge part A1a of the negative electrode active material provided area A1 in which the thickness of the negative electrode active material layer 24 tends to be nonuniform, so as to form a plurality of negative electrode tabs 22t. Furthermore, in the manufacturing method according to the present embodiment, as shown by the two-dot chain lines $L_{N3}$ of FIG. 3, the central part of the negative electrode precursor 20A in the short-transverse direction S is cut along the longitudinal direction L. By doing this, as shown in FIG. 2, it is possible to manufacture the negative electrode plate 20 in which the negative electrode tab 22t is formed only at one side of the outer circumferential edge part 20b1 of the electrode plate main body part 20b. Additionally, in the present embodiment, as shown in two-dot chain line $L_{N4}$, the negative electrode precursor 20A is cut along the short-transverse direction S at predetermined intervals in the length direction L. By doing this, it is possible to manufacture the negative electrode plate 20 having a desired length. Incidentally, the cutting step of the negative electrode precursor 20A along the two-dot chain lines $L_{N3}$, $L_{N4}$ might be performed by using a cut blade, a metal mold, a cutter, or the like, instead of laser cutting. Incidentally, in the case where laser cutting is used for cutting along the two-dot chain lines $L_{N3}$, $L_{N4}$, it is preferable to use pulse laser at a condition similar to the condition of the above described active material provided area cutting step S2 (dotted lines $L_{N1}$). By doing this, it is possible to suitably suppress the broken piece of the negative electrode active material layer 24 from being peeled off and falling off. In addition, it is enough that cutting along these two-dot chain lines $L_{N3}$, $L_{N4}$ is appropriately performed on the basis of the shape of the negative electrode plate that has been already manufactured, and cutting does not restrict the herein disclosed technique.

As described above, in the manufacturing method of the electrode plate in accordance with the present embodiment, the pulse laser is used for cutting the negative electrode active material provided area A1 (see dotted lines $L_{N1}$). By doing this, it is possible to suppress the melt metal from contaminating the negative electrode active material layer 24 and thus to suppress the adhesive property of the negative electrode active material layer 24 from being reduced, and therefore it is possible to inhibit the broken piece of the negative electrode active material layer 24 from falling off and being peeled off from the negative electrode plate 20 that has been already manufactured. On the other hand, in the manufacturing method according to the present embodiment, the pulse laser is used even for cutting the negative electrode core exposed area A2 so as to continuously cut the negative electrode active material provided area A1 and the negative electrode core exposed area A2. By doing this, it is possible to inhibit the drastic reduction in the manufacture efficiency and the occurrence of the cut failure caused by switching the type of laser. Then, in the present embodiment, the pulse laser for cutting the negative electrode core exposed area A2 is controlled to satisfy the condition defined by the above described Formula (1). By doing this, the melt amount of the electrode core at the time of cutting the negative electrode core exposed area A2 by the pulse laser can be increased to an amount similar to the CW laser, so as to suppress the scattering of the sputter. As the result, it is possible to inhibit the fine metal piece from falling off and being peeled off from the negative electrode plate 20 that has been already manufactured. As just described above, in accordance with the present embodiment, it is possible to inhibit the electrically conductive foreign substance from falling off and being peeled off from the negative electrode plate 20 that has been already manufactured, so as to contribute in improving the safety property of the secondary battery.

<Negative Electrode Plate>

Next, it will be described about the detailed structure of the electrode plate (negative electrode plate 20) manufactured by the manufacturing method of the electrode plate in accordance with the present embodiment.

(Overview of Negative Electrode Plate)

Firstly, as just shown in FIG. 2, the negative electrode plate 20 in accordance with the present embodiment includes the negative electrode core 22 and the negative electrode active material layer 24. In addition, this negative electrode plate 20 includes the electrode plate main body part 20b that is an area in which the negative electrode active material layer 24 is provided on the surface of the negative electrode core 22 and includes the negative electrode tab 22t that is an area in which the negative electrode active material layer 24 fails to be provided and thus the negative electrode core 22 is exposed. These things are already explained, and thus the overlapped explanation is omitted.

(First Thick Part)

Figure 15:
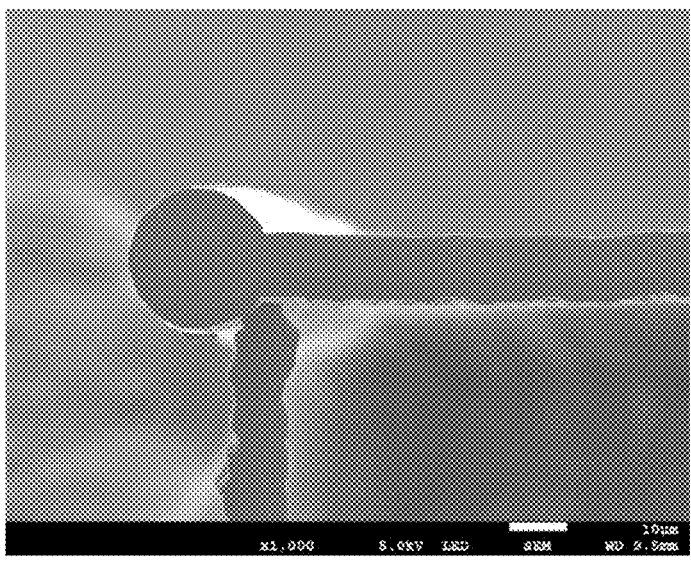
FIG. 15 is a cross section SEM photograph (1000 times) of a negative electrode tab of a negative electrode plate of a practical example.

Then, as shown in FIG. 5, the negative electrode plate 20 in accordance with the present embodiment includes a first thick part 23 which is formed at the outer circumferential edge part 22t1 of the negative electrode tab 22t and whose thickness is larger than the central part 22t2 of the negative electrode tab 22t. This first thick part 23 is a trace of the laser cut at the above described core exposed area cutting step S3. Particularly, in the manufacturing method of the electrode plate in accordance with the present embodiment, as just described above, the state of the pulse laser for cutting the negative electrode core exposed area A2 (see FIG. 3) is made to approximate the CW laser in order to suppress the scattering of the sputter. At the outer circumferential edge part 22t1 of the negative electrode tab 22t cut by the pulse laser as described above, the first thick part 23 is formed which is a trace of melt cutting on the metal foil and whose cross section approximates a round shape, similarly to the case where the CW laser is used to cut. Incidentally, here the phrase "cross section approximates a round shape" means that the aspect ratio of the first thick part 23 on the cross section along the thickness direction T of the negative electrode tab 22t as shown in FIG. 5 is equal to or more than 0.85. The aspect ratio of the first thick part 23 as described above is calculated on the basis of a cross section photograph of the electrode tab (see FIG. 15) obtained by the scanning electron microscope (SEM). A particular calculating means for the aspect ratio of the first thick part 23 is just described below. At first, a cross section photograph of the negative electrode tab as shown in FIG. 15 is obtained. Next, on this cross section photograph, the first thick part is surrounded with a square having two sides along the surface of the negative electrode core. Then, short-side and long-side of the rectangle surrounding this first thick part are measured and then a value obtained with dividing the short-side by the long-side (short-side/long-side) is treated as the aspect ratio. Incidentally, the wording "aspect ratio" in the present specification is an average value of the aspect ratios of the first thick part confirmed with a plurality of points of view (typically, one or more points of view). Incidentally, the cross sectional shape of the first thick part is not restricted to either the round or the oval, and thus the cross sectional shape might partially include a lack or a distortion. Even for the first thick part including the lack or the distortion as described above, the aspect ratio can be calculated according to the above described procedure.

Incidentally, in the case where the cross sectional shape of the first thick part 23 approximates the round shape, it is possible to inhibit another member from being damaged when said another member (for example, separator 30 shown in FIG. 13) comes into contact with the outer circumferential edge part 22t1 of the negative electrode tab 22t. Thus, regarding the aspect ratio of the first thick part 23, 0.88 or more is preferable, and 0.90 or more is further preferable. On the other hand, the upper limit of the aspect ratio of the first thick part 23 is not particularly restricted, and thus the upper limit might be equal to or less than 1.00. In addition, it is enough that the first thick part 23 is thicker than the central part 22t2 of the negative electrode tab 22t, and the particular thickness is not especially restricted. For example, the rate (t1/t2) of the thickness t1 of the first thick part 23 with respect to the thickness t2 of the central part 22t2 might be equal to or more than 1.1, might be equal to or more than 1.2, might be equal to or more than 1.4, or might be equal to or more than 1.5. On the other hand, the upper limit of the above described t1/t2 might be equal to or less than 7, might be equal to or less than 6, might be equal to or less than 5, or equal to or less than 3.

In addition, the manufacturing method of the electrode plate in accordance with the present embodiment, as just described above, controls the condition of the pulse laser for cutting the negative electrode core exposed area A2 (see FIG. 3) so as to satisfy the above described Formula (1). If melt cutting is performed on the negative electrode core exposed area A2 with the pulse laser at the high lap rate as described above, the melted electrode core is deformed into an approximately spherical shape by the surface tension, and thus a melt metal dense portion and a melt metal sparse portion are alternately formed. Therefore, it is probable that the first area whose thickness is relatively large and the second area whose thickness is relatively small are alternately formed at the outer circumferential edge part 22t1 of the negative electrode tab 22t of the negative electrode plate 20 in accordance with the present embodiment.

Additionally, in the case where the pulse laser is used to cut the negative electrode core exposed area A2, it is possible to cut off the negative electrode tab 22t and the negative electrode core exposed area A2 at just the time of having irradiated the laser, and thus it is not required to perform a processing for peeling off the negative electrode tab 22t from the negative electrode core exposed area A2 as in the case where the CW laser is used. As the result, on the negative electrode plate 20 that has been already manufactured, it tends to arrange the center point C of the first thick part 23 between a pair of extended lines E1, E2 extending from respective surfaces (upper surface and lower surface) of the central part 22t2 of the negative electrode tab 22t, which is different from the cut trace formed by the CW laser (see FIG. 19). In the case where the center point C of the first thick part 23 is arranged at the vicinity of the center in the thickness direction of the negative electrode tab 22t as described above, the bending process of the negative electrode tab 22t becomes easy, and thus it is possible to contribute in enhancing the manufacture efficiency of the secondary battery.

(Second Thick Part)

On the other hand, as shown in FIG. 6, in the present embodiment, the second thick part 25 whose thickness is larger than the negative electrode core 22 at the central part 20b2 of the electrode plate main body part 20b is formed at the end part of the negative electrode core 22 on the outer circumferential edge part 20b1 of the electrode plate main body part 20b. The second thick part 25 as described above is a trace mark induced by irradiating the pulse laser on the negative electrode active material provided area A1 of the negative electrode precursor 20A at the above described active material provided area cutting step S2. This second thick part 25 is formed by cutting the negative electrode core 22 with the high energy pulse laser. In addition, a coating layer 25b is stuck on the surface of the second thick part 25. This coating layer 25b is the negative electrode active material layer 24 after the pulse laser is irradiated, and contains a negative electrode active material. In addition, the negative electrode active material layer 24 might contain a sintered substance of the negative electrode active material, or the like. Then, as shown in FIG. 6, the thickness of the coating layer 25b is thinner than the thickness of the negative electrode active material layer 24. The coating layer 25b as described above has the closely bonded property with respect to the surface of the negative electrode core 22 (second thick part 25), the closely bonded property is better in comparison with the negative electrode active material layer in which the melt metal is contaminated, and thus it is possible to suitably inhibit the electrically conductive foreign substance from being peeled off and falling off.

Incidentally, it is enough for the second thick part 25 and the coating layer 25b described above to be formed on at least one side of the outer circumferential edge part (see FIG. 2) of the electrode plate main body part 20b. Particularly, in the present embodiment, the outer circumferential edge part 20b1 of the electrode plate main body part 20b positioned on the negative electrode tabs 22t is cut by the pulse laser, and thus the second thick part 25 and the coating layer 25b are formed in the area on this negative electrode tab 22t.

In addition, the second thick part 25 has a claw hook shape that includes a shade part 25a1 protruding towards the both sides or one side of the thickness direction T of the negative electrode core 22 and that includes a recessed part 25a2 formed between the shade part 25a1 and the negative electrode core 22. The second thick part 25 is, different from the above described first thick part 23, formed by the pulse laser whose output is large, thus the melt amount of the negative electrode core 22 is small, and therefore the second thick part can have the claw hook shape as described above. Into the inside of the recessed part 25a2 of the second thick part 25 formed in the claw hook shape as described above, the coating layer 25b is entered. By doing this, the outstanding anchor effect is provided, thus the coating layer 25b is held further firmly, and therefore it is possible to furthermore suitably inhibit the broken piece of the negative electrode active material layer 24 from falling off and being peeled off. Incidentally, the event that the second thick part 25 having such a claw hook shape is formed can cause a damage on another member (e.g., separator of the secondary battery). However, in the present embodiment, the second thick part 25 is covered by the coating layer 25b, and thus it is possible to suitably inhibit the second thick part 25 having the claw hook shape from giving damages on another member. Incidentally, regarding the thickness of the coating layer 25b stuck on the surface of the second thick part 25, from the perspective of suitably inhibiting the second thick part 25 from giving damages on another member, 1 μm or more is preferable, 2.5 μm or more is further preferable, and 5 μm or more is furthermore preferable. On the other hand, the upper limit of the thickness of the coating layer 25b is not particularly restricted, and it might be equal to or less than 20 μm, equal to or less than 17.5 μm, or equal to or less than 15 μm.

Incidentally, regarding the thickness of the shade part 25a1 of the above described second thick part 25, 1 μm or more is preferable, 2.5 μm or more is further preferable, and 4 μm or more is furthermore preferable. By doing this, it is possible to provide the more suitable anchor effect. Incidentally, the above described "thickness of the shade part" is a thickness at the one side of the shade part 25a1 on the basis of the core surface being as the reference. In addition, regarding the upper limit value of the thickness of the shade part 25a1, from the perspective of more surely inhibiting the damage on another member, 30 μm or less is preferable, 25 μm or less is further preferable, and 20 μm or less is furthermore preferable. On the other hand, the width of the shade part 25a1 (size of the negative electrode plate in the short-transverse direction S) is not particularly restricted. For example, the width of the shade part 25a1 might be 1 μm to 30 μm, might be 5 μm to 25 μm, or might be 10 μm to 20 μm. Furthermore, regarding the height of the inlet of the recessed part 25a2 of the second thick part 25 (size in the thickness direction T), 1 μm to 10 μm is preferable, and 2.5 μm to 7.5 μm is further preferable. On the other hand, regarding the depth of the recessed part 25a2 of the second thick part 25 (size of the negative electrode plate in the short-transverse direction S), 0.1 to 10 μm is preferable, and 2.5 μm to 7.5 μm is further preferable. By doing this, it is possible to hold an appropriate amount of the coating layer 25*b* inside the recessed part 25*a*2 so as to be capable of providing the more suitable anchor effect. In addition, regarding the angle of the shade part 25*a*1 rising from the surface of the negative electrode core 22, more than 0° but equal to or less than 90° is preferable.

In addition, the aspect ratio of the second thick part 25 can be a value smaller than the aspect ratio of the first thick part 23. As described above, the second thick part 25 is a cut trace formed by the high energy pulse laser, and thus it is hard to make the cross sectional shape be an approximately round, which is different from the first thick part 23. Particularly, the upper limit value of the aspect ratio of the second thick part 25 can be equal to or less than 0.85 (typically, equal to or less than 0.82, or for example, equal to or less than 0.80). On the other hand, the lower limit value of the aspect ratio of the second thick part 25 can be equal to or more than 0.40 (typically, equal to or more than 0.45, or for example, equal to or more than 0.50). Incidentally, the aspect ratio of the second thick part can be measured according to a procedure similar for the aspect ratio of the first thick part as described above.

<Secondary Battery>

Figure 7:
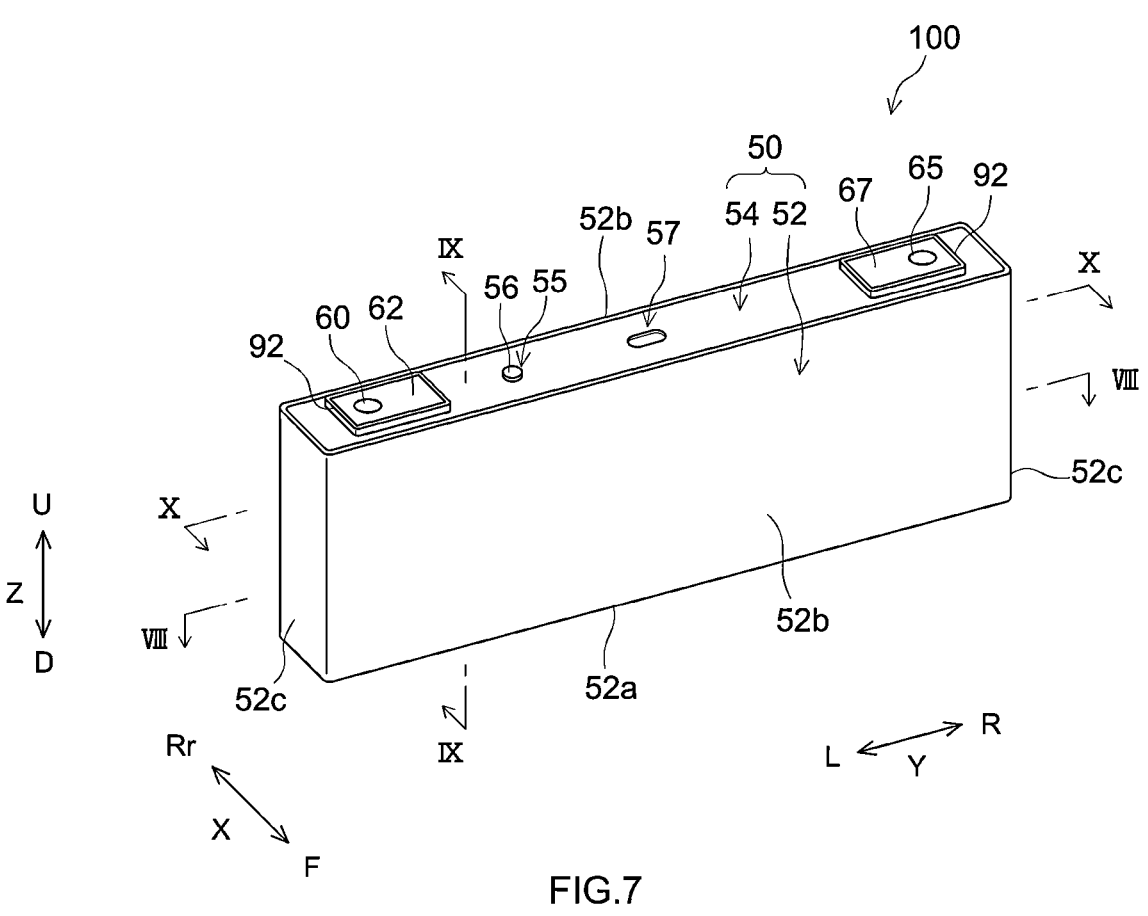
FIG. 7 is a perspective view that schematically shows a secondary battery in accordance with one embodiment.
Figure 8:
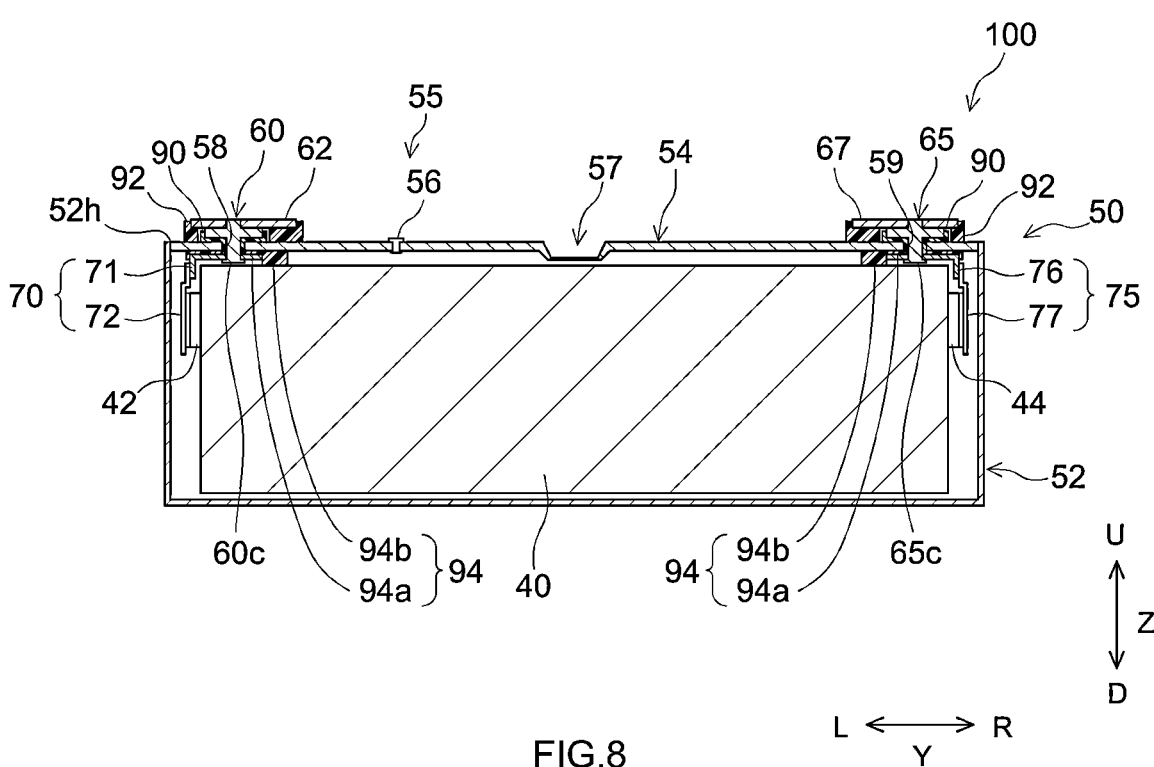
FIG. 8 is a longitudinal cross section view that is schematically shown along the VIII-VIII line of FIG. 7.
Figure 9:
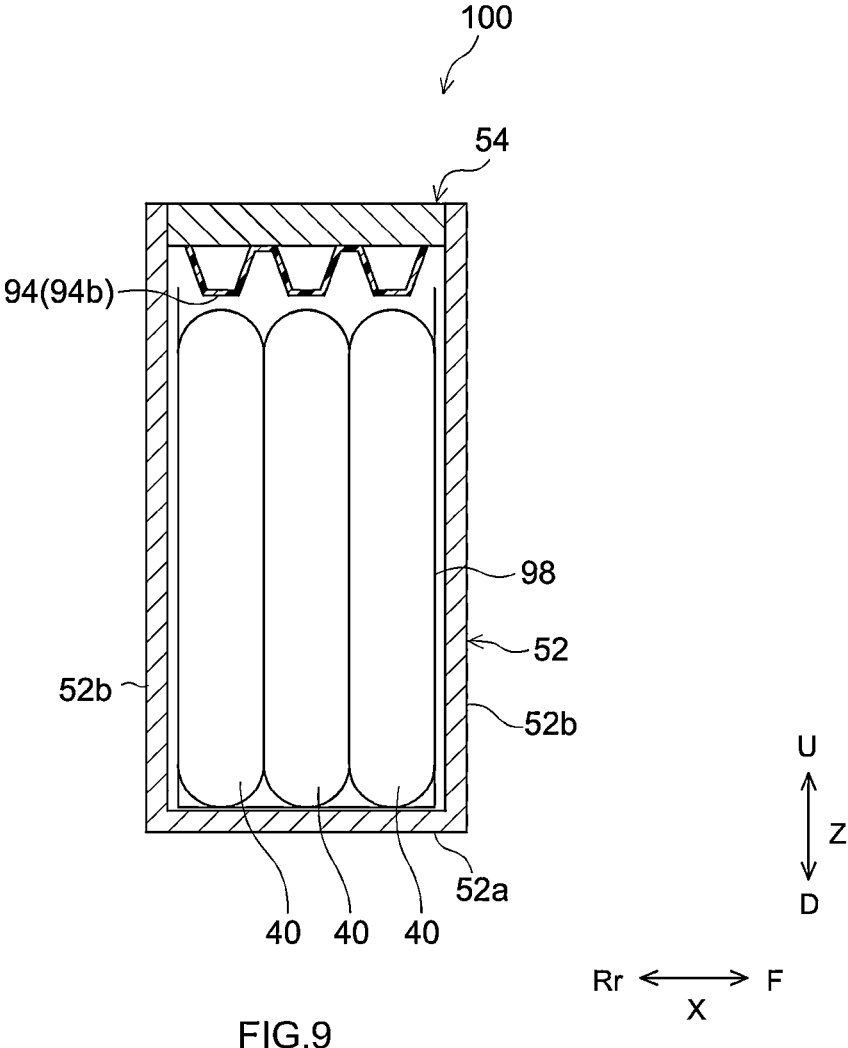
FIG. 9 is a longitudinal cross section view that is schematically shown along the IX-IX line of FIG. 7.
Figure 10:
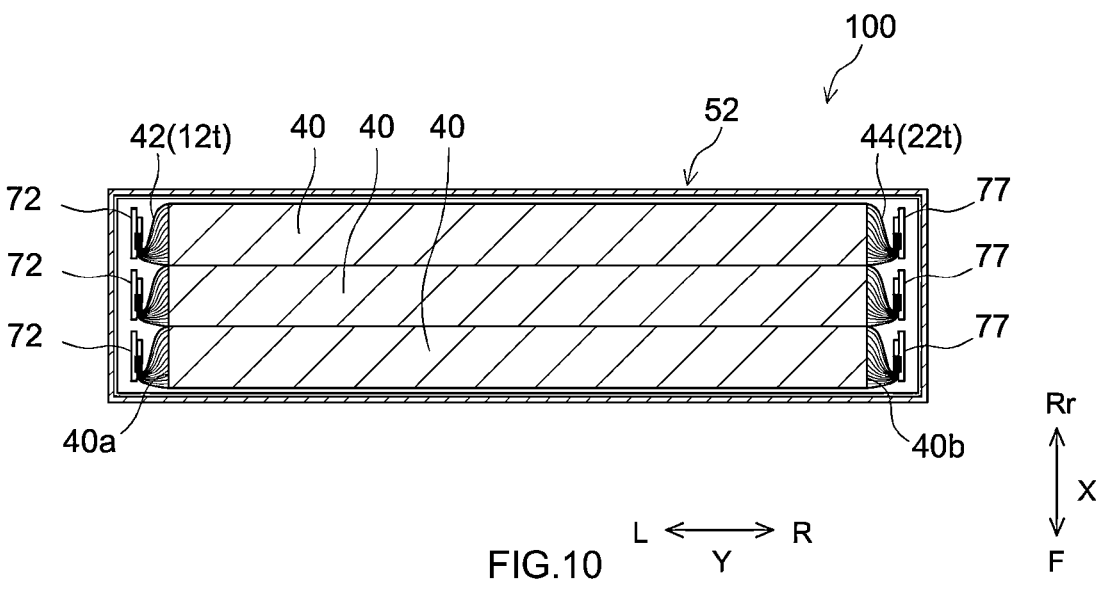
FIG. 10 is a lateral cross section view that is schematically shown along the X-X line of FIG. 7.
Figure 11:
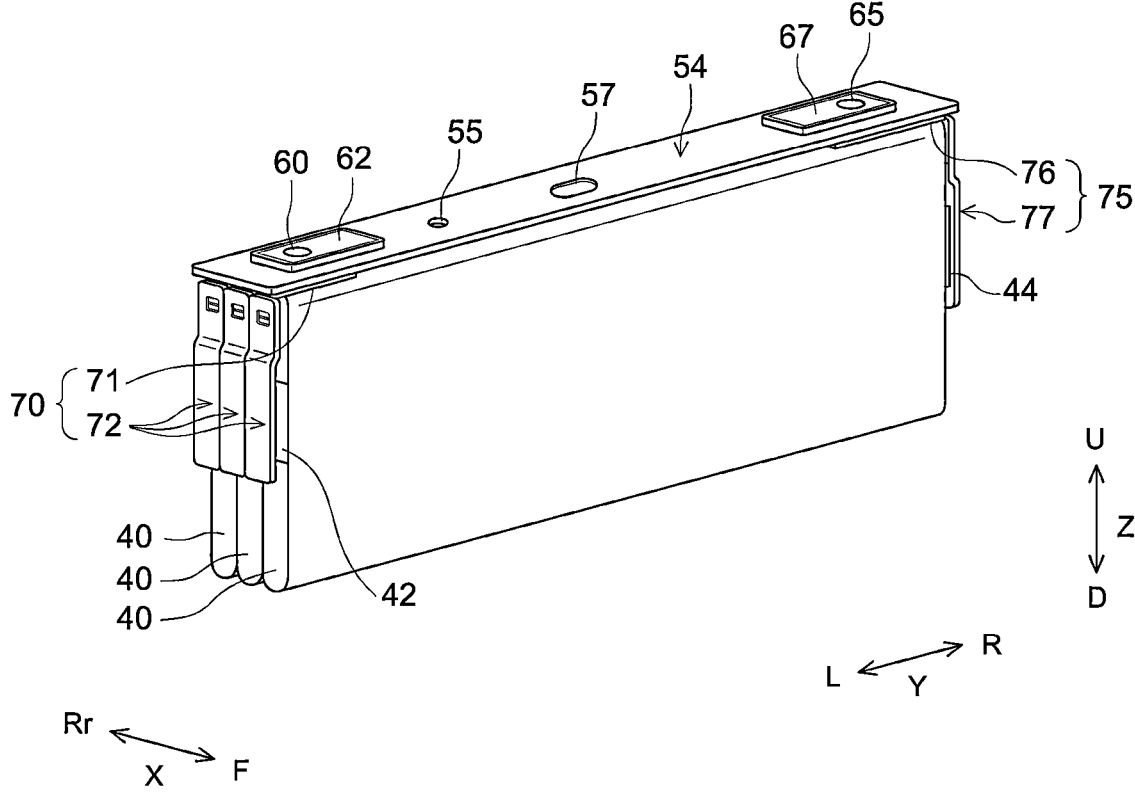
FIG. 11 is a perspective view that schematically shows an electrode body attached to a sealing plate.
Figure 12:
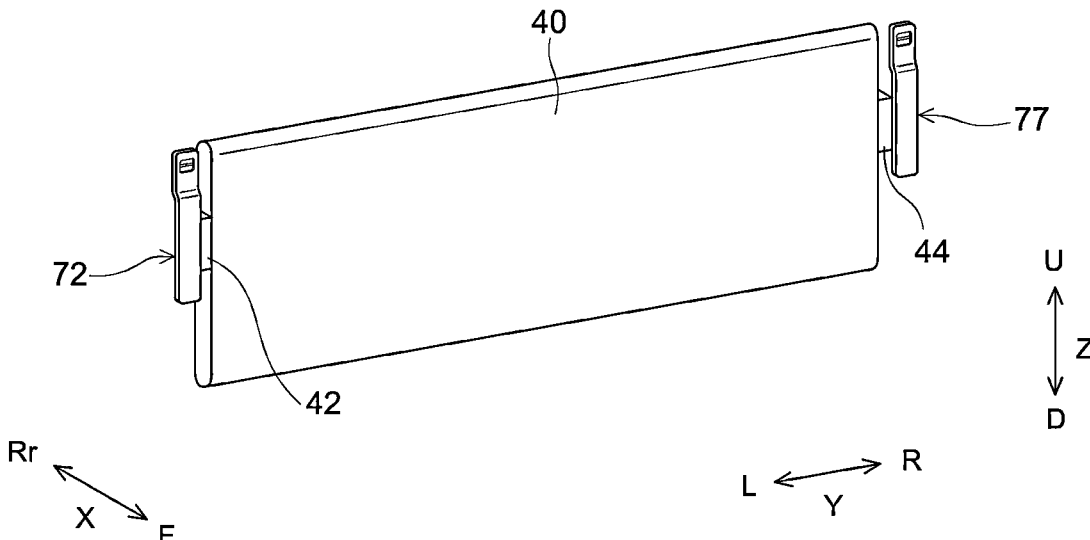
FIG. 12 is a perspective view that schematically shows the electrode body attached to a positive electrode second electrical collector part and a negative electrode second electrical collector part.
Figure 13:
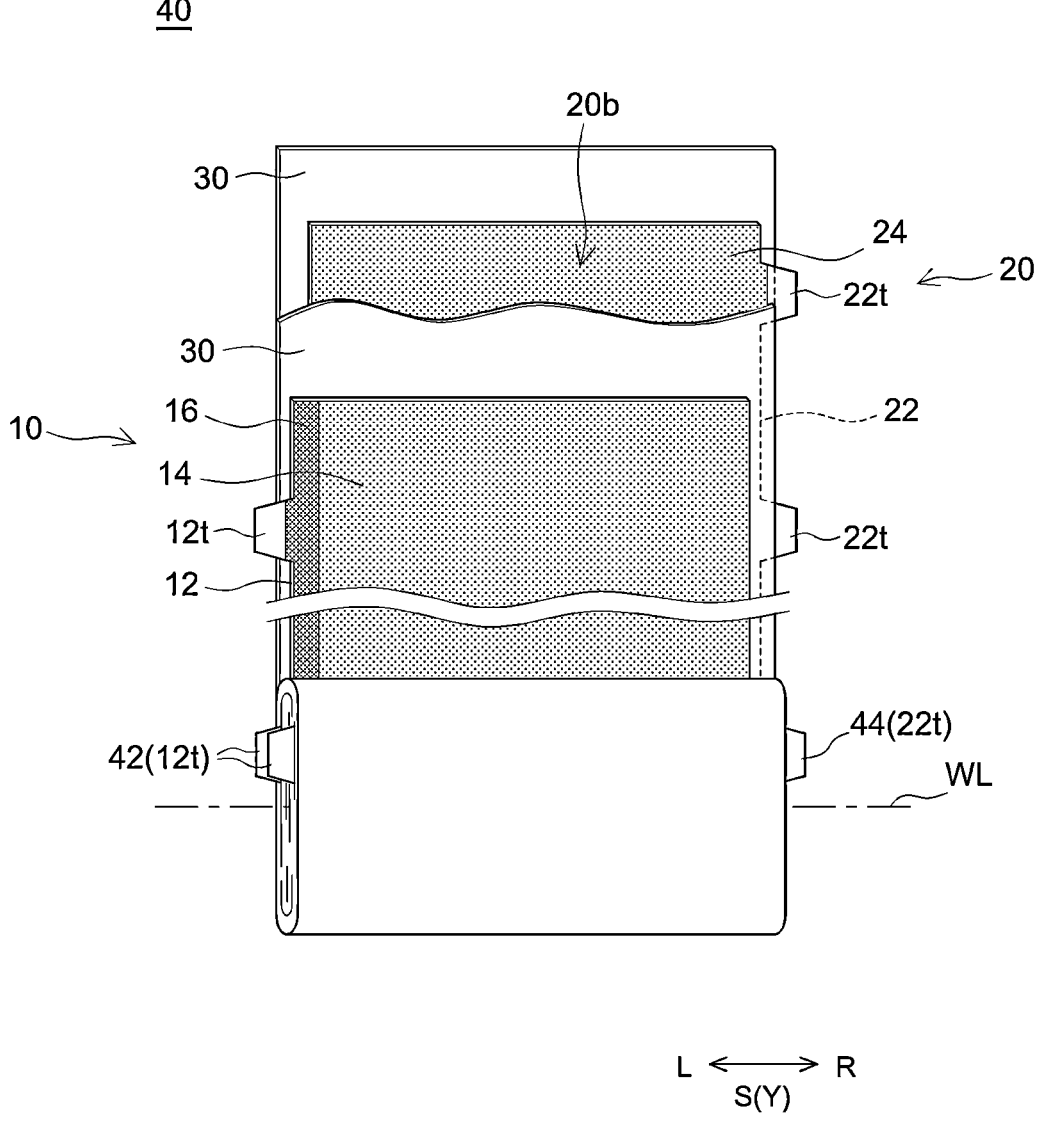
FIG. 13 is a perspective view for explaining the electrode body of the secondary battery in accordance with one embodiment.
Figure 14:
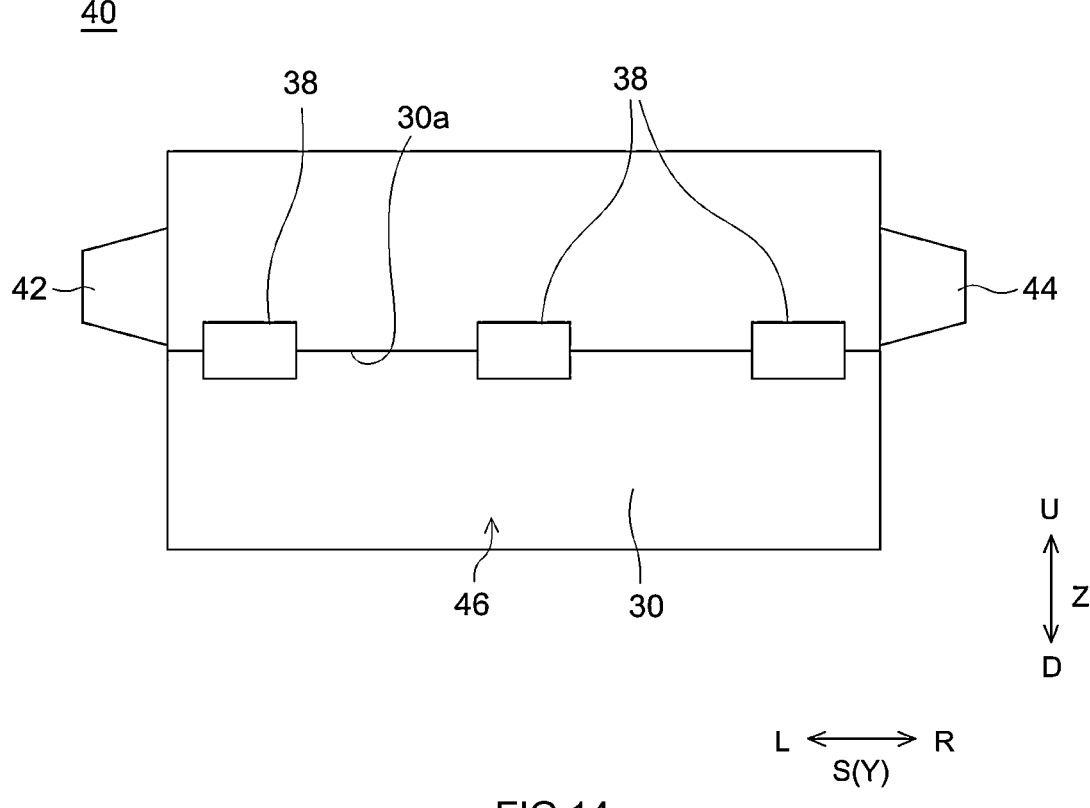
FIG. 14 is a front view that shows the electrode body of the secondary battery in accordance with one embodiment.

Next, the secondary battery will be described that is manufactured with the negative electrode plate 20 in accordance with the present embodiment. FIG. 7 is a perspective view that schematically shows the secondary battery in accordance with the present embodiment. FIG. 8 is a longitudinal cross section view that is schematically shown along the VIII-VIII line of FIG. 7. FIG. 9 is a longitudinal cross section view that is schematically shown along the IX-IX line of FIG. 7. FIG. 10 is a lateral cross section view that is schematically shown along the X-X line of FIG. 7. FIG. 11 is a perspective view that schematically shows the electrode body attached to a sealing plate. FIG. 12 is a perspective view that schematically shows the electrode body attached to a positive electrode second electrical collector part and a negative electrode second electrical collector part. FIG. 13 is a perspective view for explaining the electrode body of the secondary battery in accordance with the present embodiment. FIG. 14 is a front view that shows the electrode body of the secondary battery in accordance with the present embodiment. Incidentally, the reference sign X in FIGS. 7 to 14 represents the "thickness direction" of the secondary battery 100, the reference sign Y represents the "width direction", and the reference sign Z represents the "vertical direction". Additionally, in the thickness direction X, F represents the "front" and Rr represents the "rear". In the width direction Y, L represents the "left" and R represents the "right". Then, in the vertical direction Z, U represents the "up" and D represents the "down". However, these directions are defined for convenience sake of explanation, and are not intended to restrict the disposed form of the secondary battery 100.

As shown in FIGS. 7 to 10, this secondary battery 100 includes a wound electrode body 40, a battery case 50, a positive electrode terminal 60, a negative electrode terminal 65, a positive electrode electrical collector part 70, and a negative electrode electrical collector part 75. In addition, as not shown in figures, not only the wound electrode body 40 but also a nonaqueous electrolyte is accommodated in the battery case 50 of this secondary battery 100. This nonaqueous electrolyte is prepared by dissolving a supporting salt in a nonaqueous type solvent. As one example of the nonaqueous type solvent, it is possible to use a carbonate type solvent, such as ethylene carbonate, dimethyl carbonate, and ethyl methyl carbonate. As one example of the supporting salt, it is possible to use a fluorine contain lithium salt, such as $LiPF_6$.

(Battery Case)

The battery case 50 is a housing that accommodates the wound electrode body 40. The battery case 50 here has an outer shape that is a flat and bottomed rectangular parallelopiped shape (square shape). It is enough for the material of the battery case 50 to use a material the same as the conventionally used one, and the material is not particularly restricted. It is preferable that the battery case 50 is made of metal, and it is further preferable that the battery case is made of, for example, aluminum, aluminum alloy, iron, iron alloy, or the like. The battery case 50 includes an outer package 52 and a sealing plate 54.

The outer package 52 is a container formed in a flat and bottomed square shape that includes an opening 52*h* at the upper surface. As shown in FIG. 7, the outer package 52 includes a bottom wall 52*a* formed in a flat surface approximately rectangular shape, a pair of long side walls 52*b* extending from the long side of the bottom wall 52*a* in the vertical direction Z, and a pair of short side walls 52*c* extending from the short side of the bottom wall 52*a* in the vertical direction Z. On the other hand, the sealing plate 54 is a plate-shaped member formed in a flat surface approximately rectangular shape that covers the opening 52*h* of the outer package 52. Then, the outer circumferential edge part of the sealing plate 54 is joined (e.g., by welding) to the outer circumferential edge part of the opening 52*h* of the outer package 52. By doing this, the battery case 50 whose inside is airtightly sealed (airtightly closed) is manufactured. In addition, the sealing plate 54 is provided with a liquid injection hole 55 and a gas exhaust valve 57. The liquid injection hole 55 is provided for performing liquid injection of the nonaqueous electrolyte into the battery case 50 to which the outer package 52 and the sealing plate 54 have been already joined. Incidentally, the liquid injection hole 55 is sealed by the seal member 56 after the liquid injection of the nonaqueous electrolyte is performed. In addition, the gas exhaust valve 57 is a thin-walled part that is designed to be broken (opened) by a predetermined pressure so as to exhaust gas inside the battery case 50 when a large amount of gas generates inside the battery case 50.

(Electrode Terminal)

In addition, a positive electrode terminal 60 is attached to one end part (left side in FIG. 7 and FIG. 8) of the sealing plate 54 in the long side direction Y of the secondary battery 100. The positive electrode terminal 60 as described above is connected to a plate-shaped positive electrode outside electrically conductive member 62 at a position outside the battery case 50. On the other hand, a negative electrode terminal 65 is attached to the other end part (right side in FIG. 7 and FIG. 8) of the sealing plate 54 in the long side direction Y of the secondary battery 100. Even to the negative electrode terminal 65 as described above, a plate-shaped negative electrode outside electrically conductive member 67 is attached. These outside electrically conductive members (positive electrode outside electrically conductive member 62 and negative electrode outside electrically conductive member 67) are connected to other secondary battery or outside equipment through an outside connecting member (bus bar, or the like). Incidentally, it is preferable that the outside electrically conductive member is configured with a metal having an outstanding electric conductive property (aluminum, aluminum alloy, copper, copper alloy, or the like).

(Electrode Electrical Collector Part)

The secondary battery 100 accommodates a plurality of (3 in figures) wound electrode bodies 40 inside the battery case 50. The positive electrode terminal 60 is connected to each of the plurality of wound electrode bodies 40 through a positive electrode electrical collector part 70 accommodated in the battery case 50. In particular, a positive electrode electrical collector part 70 connecting the positive electrode terminal 60 and the wound electrode body 40 is accommodated in the battery case 50. As shown in FIGS. 8 and 11, the positive electrode electrical collector part 70 includes a positive electrode first electrical collector part 71 that is a plate-shaped electrically conductive member extending along the inside surface of the sealing plate 54, and includes a plurality of positive electrode second electrical collector parts 72 that are plate-shaped electrically conductive members extending along the vertical direction Z. Then, the bottom end part 60*c* of the positive electrode terminal 60 extends toward the inside of the battery case 50 through the terminal insertion hole 58 of the sealing plate 54, and is connected to the positive electrode first electrical collector part 71 (see FIG. 8). As shown in FIGS. 11 and 12, the positive electrode second electrical collector part 72 is connected to a positive electrode tab group 42 of each of a plurality of wound electrode bodies 40. Then, as shown in FIG. 10, the positive electrode tab group 42 of the wound electrode body 40 is folded and bended so as to arrange the positive electrode second electrical collector part 72 and the one side surface 40*a* of the wound electrode body 40 opposed to each other. By doing this, the top end part of the positive electrode second electrical collector part 72 and the positive electrode first electrical collector part 71 are electrically connected.

On the other hand, the negative electrode terminal 65 is connected to each of the plurality of wound electrode bodies 40 through a negative electrode electrical collector part 75 accommodated in the battery case 50. The connection structure at the negative electrode side is approximately the same as the connection structure of the positive electrode side described above. Particularly, the negative electrode electrical collector part 75 includes a negative electrode first electrical collector part 76 that is a plate-shaped electrically conductive member extending along the inside surface of the sealing plate 54, and includes a plurality of negative electrode second electrical collector parts 77 that are plate-shaped electrically conductive members extending along the vertical direction Z. Then, the bottom end part 65*c* of the negative electrode terminal 65 extends toward the inside of the battery case 50 through the terminal insertion hole 59 so as to be connected to the negative electrode first electrical collector part 76 (see FIG. 8). The negative electrode second electrical collector part 77 is connected to a negative electrode tab group 44 of each of the plurality of wound electrode bodies 40 (see FIGS. 11 and 12). Then, the negative electrode tab group 44 is folded and bended so as to arrange the negative electrode second electrical collector part 77 and the other side surface 40*b* of the wound electrode body 40 opposed to each other (see FIG. 10). By doing this, the top end part of the negative electrode second electrical collector part 77 and the negative electrode first electrical collector part 76 are electrically connected.

(Insulation Member)

In addition, the secondary battery 100 in accordance with the present embodiment is provided with various insulation members attached for inhibiting the conduction between the wound electrode body 40 and the battery case 50. Particularly, an outside insulation member 92 is disposed between the positive electrode outside electrically conductive member 62 (negative electrode outside electrically conductive member 67) and the outside surface of the sealing plate 54 (see FIG. 7). By doing this, it is possible to inhibit the positive electrode outside electrically conductive member 62 and the negative electrode outside electrically conductive member 67 from being conducted to the sealing plate 54. In addition, a gasket 90 is attached to each of the terminal insertion holes 58, 59 of the sealing plate 54 (see FIG. 8). By doing this, it is possible to inhibit the positive electrode terminal 60 (or the negative electrode terminal 65) inserted into the terminal insertion holes 58, 59 from being conducted to the sealing plate 54. In addition, an inside insulation member 94 is arranged between the positive electrode first electrical collector part 71 (or the negative electrode first electrical collector part 76) and the inside surface of the sealing plate 54. This inside insulation member 94 includes a plate-shaped base part 94*a* disposed between the positive electrode first electrical collector part 71 (or the negative electrode first electrical collector part 76) and the inside surface of the sealing plate 54. By doing this, it is possible to inhibit the positive electrode first electrical collector part 71 and the negative electrode first electrical collector part 76 from being conducted to the sealing plate 54. Further, the inside insulation member 94 includes a protruding part 94*b* that protrudes toward the wound electrode body 40 from the inside surface of the sealing plate 54. By doing this, it is possible to regulate movement of the wound electrode body 40 in the vertical direction Z so as to inhibit the direct contact of the wound electrode body 40 and the sealing plate 54. Furthermore, the wound electrode body 40 is accommodated in the battery case 50 in a state of being covered by an electrode body holder 98 consisted of a resin sheet having an insulating property (see FIG. 9). By doing this, it is possible to inhibit the direct contact of the wound electrode body 40 and the outer package 52. Incidentally, the material of each insulation member described above is not particularly restricted, if having a predetermined insulating property. As one example, it is possible to use a synthetic resin material, such as polyolefin type resin (for example, polypropylene (PP), and polyethylene (PE)), and fluorine type resin (for example, perfluoro alkoxy alkane (PFA), and polytetrafluoroethylene (PTFE)).

(Wound Electrode Body)

Next, the electrode body will be described that is used for the secondary battery 100 in accordance with the present embodiment. The present embodiment uses the wound electrode body 40, as the electrode body, whose configuration is shown in FIG. 13. The wound electrode body 40 includes a pair of electrode plates (positive electrode plate 10 and negative electrode plate 20) that are wound therein in a state of being opposed to each other through a separator 30. For manufacturing this wound electrode body 40, firstly, a laminated body is formed in which the long strip-like shaped positive electrode plate 10 and the long strip-like shaped negative electrode plate 20 are laminated while the long strip-like shaped separator 30 is disposed between them. Then, after this laminated body is wound along the longitudinal direction, a winding stop tape 38 (see FIG. 14) is attached to the terminal end part 30*a* of the separator 30 arranged at the outermost circumference. By doing this, it is possible to manufacture the wound electrode body 40. Then, the present embodiment uses the negative electrode plate 20 having the above described structure, for manufacturing this wound electrode body 40. Below, the wound electrode body 40 in the present embodiment will be described.

Firstly, the separator 30 is a sheet-shaped member including a function of not only inhibiting the contact of the positive electrode plate 10 and the negative electrode plate 20 but also passing the electric charge carrier through. As for one example of the separator 30 as described above, it is possible to use a resin sheet on which a plurality of fine holes capable of passing electric charge carriers are formed. It is preferable that the resin sheet as described above includes a resin layer consisted of polyolefin resin (for example, polyethylene (PE) and polypropylene (PP)). In addition, on the surface of the above described resin sheet, a heat resistant layer might be formed that contains an inorganic filler, such as alumina, boehmite, water oxidation aluminum, and titania.

The positive electrode plate 10 includes a positive electrode core 12 that is a foil-shaped metal member, a positive electrode active material layer 14 that is provided on the surface of the positive electrode core 12, and a protective layer 16 that is provided on the surface of the positive electrode core 12 to be adjacent to the side edge part 10a of the positive electrode plate 10. Furthermore, on the side edge part 10a of the positive electrode plate 10, a plurality of positive electrode tabs 12t protruding toward the outside in the short-transverse direction S (left side in FIG. 13) are provided at predetermined intervals in the longitudinal direction L of the positive electrode plate 10. This positive electrode tab 12t is an area on which neither the positive electrode active material layer 14 nor the protective layer 16 is provided and the positive electrode core 12 is exposed. Incidentally, it is preferable from the perspective of the battery performance that the positive electrode active material layer 14 and the protective layer 16 are provided on the both surfaces of the positive electrode core 12. In addition, the protective layer 16 might be provided to make one part of it cover the side edge part of the positive electrode active material layer 14. Incidentally, regarding the material of each member (positive electrode core 12, positive electrode active material layer 14, and protective layer 16) configuring the positive electrode plate 10, a conventionally well known material capable of being used in a general secondary battery (for example, lithium ion secondary battery) can be used without particular restriction, which does no restrict the herein disclosed technique, and thus detailed explanation for the material is omitted.

On the other hand, the configuration of the negative electrode plate 20 used for the secondary battery 100 in accordance with the present embodiment is as described above. Regarding the negative electrode plate 20 as described above, the pulse laser is used for cutting out the electrode plate main body part 20b from the negative electrode active material provided area A1 of the negative electrode precursor 20A (see FIG. 3). Thus, in the negative electrode plate 20 according to the present embodiment, the reduction in the adhesive property of the negative electrode active material layer 24 caused by the contamination of the melt metal is suppressed. As this result, it is possible to inhibit the situation where, after the secondary battery 100 is constructed, the broken piece of the negative electrode active material layer 24 falls off or is peeled off so as to cause the internal short circuit. Furthermore, regarding this negative electrode plate 20, the pulse laser approximating the CW laser is used for cutting out the negative electrode tab 22t from the negative electrode core exposed area A2 of the negative electrode precursor 20A (see FIG. 3). Thus, in the negative electrode plate 20 according to the present embodiment, the stick of the fine metal piece (sputter) is suppressed. As this result, it is possible to inhibit the situation where, after the secondary battery 100 is constructed, the sputter falls off or is peeled off so as to cause the internal short circuit. In other words, the secondary battery 100 in accordance with the present embodiment inhibits the various electrically conductive foreign substances from falling off and being peeled off from the negative electrode plate 20 so as to have the high safety property.

Another Embodiment

Above, one embodiment of the herein disclosed technique is explained. Incidentally, the above described embodiment represents an example to which the herein disclosed technique is applied, and the above described embodiment does not restrict the herein disclosed technique.

For example, in the above described embodiment, the negative electrode plate is treated as the manufacture target for the manufacturing method of the electrode plate herein disclosed. However, the manufacture target for the manufacturing method of the electrode plate herein disclosed is not restricted to the negative electrode plate, and the positive electrode plate might be treated as the manufacture target. Even in the case where the positive electrode plate is treated as the manufacture target while described above, it is possible to inhibit the electrically conductive foreign substance (broken piece of the positive electrode active material layer or sputter) from falling off and being peeled off from the electrode plate (positive electrode plate) that has been already manufactured. Incidentally, the negative electrode plate having been manufactured in the above described embodiment tends to occur the reduction in the adhesive property of the electrode active material layer caused by the contamination of the melt metal, compared with the positive electrode plate. Whereas, by using the manufacturing method of the electrode plate herein disclosed, it is possible to properly suppress the contamination of the melt metal as described above. Thus, the manufacturing method of the electrode plate herein disclosed can be applied particularly in a suitable manner to the manufacture of the negative electrode plate.

In addition, the above described embodiment uses the wound electrode body as the electrode body. However, it is enough for the electrode body to make the positive electrode plate and the negative electrode plate be opposed to each other through the separator, and the electrode body is not restricted to the wound electrode body. As for another example of the structure of the electrode body, it is possible to use a laminate electrode body in which a plurality of positive electrode plates and negative electrode plates are sequentially laminated while separators are respectively disposed between them. In order to manufacture this kind of negative electrode plate for laminate electrode body, the cutting step along the short-transverse direction S as shown by the two-dot chain lines $L_{N4}$ in FIG. 3 might be performed for each one of the negative electrode tabs 22t. Although the detailed explanation is omitted, the manufacture of the positive electrode plate is also similarly performed. Then, for laminating the positive electrode tabs at the same position and for laminating the negative electrode tabs of the negative electrode plate at the same position, a plurality of positive electrode plates and a plurality of negative electrode plates are laminated while separators are respectively disposed between them. By doing this, it is possible to manufacture the laminate electrode body.

Additionally, the above described embodiment has the target set to be the high capacity secondary battery 100 accommodating three wound electrode bodies 40 inside the battery case 50. However, the number of the electrode body accommodated in one battery case is not particularly restricted, and the number might be equal to or more than 2 (plural), or might be 1. Furthermore, the secondary battery 100 in accordance with the above described embodiment is a lithium ion secondary battery in which the lithium ion is the electric charge carrier. However, the secondary battery herein disclosed is not restricted to the lithium ion secondary battery. Even in the manufacture step for the other secondary batteries (e.g., nickel hydrogen battery), there is a step for cutting the active material provided area and core exposed area of the electrode precursor by the laser, and thus the herein disclosed technique can be applied without particular restriction.

In addition, the secondary battery 100 in accordance with the above described embodiment is a nonaqueous electrolyte secondary battery using a nonaqueous electrolyte as the electrolyte. However, the herein disclosed technique can be applied to a battery other than the nonaqueous electrolyte secondary battery. As for another example of the structure of the secondary battery, it is possible to use an all-solid battery. This all-solid battery is provided with a solid electrolyte layer configured with a solid electrolyte formed in a sheet shape, as the separator disposed between the positive electrode plate and the negative electrode plate. In this all-solid battery, the separator and the electrolyte are integrated and included inside the electrode body, and thus it is possible to inhibit the leak of the electrolyte or the like. Even in the manufacture step for this kind of the all-solid battery, there is a step for cutting the active material provided area and core exposed area of the electrode precursor by the laser, and thus the herein disclosed technique can be applied without particular restriction.

Test Example

Below, a test example related to the present disclosure is explained. Incidentally, the content of the test example described below is not intended to restrict the present disclosure.

First Test

(1) Sample Preparation

Practical Example 1

In Practical example 1, pulse lasers at different conditions were used for the negative electrode active material provided area and for the core exposed area of the negative electrode precursor, so as to manufacture the negative electrode for lithium ion secondary battery. At first, a negative electrode precursor was prepared that was provided with a negative electrode active material layer whose thickness was 80 μm on the both surfaces of the negative electrode core (copper foil) whose thickness was 8 μm. This negative electrode active material layer of the negative electrode precursor contains a negative electrode active material, a thickening agent, and a binder, and the rate of them is 98.3:0.7:1.0. Incidentally, graphite (graphite) was used as for the negative electrode active material, carboxy methyl cellulose (CMC) was used as for the thickening agent, and styrene butadiene rubber (SBR) was used as for the binder. Next, the negative electrode precursor was cut into a predetermined shape so as to cut out the negative electrode plate. In particular, for cutting the negative electrode active material provided area, the pulse laser was used whose pulse width was 240 ns and whose lap rate was 89%. On the other hand, for cutting the core exposed area, the pulse laser was used whose pulse width was 240 ns and whose lap rate was 90%. In addition, the frequency of the pulse laser for cutting the negative electrode active material provided area was 300 kHz, and the frequency of the pulse laser for cutting the core exposed area was 450 kHz. In addition, the spot diameter of the pulse laser was set to be 30 μm for any of the negative electrode active material provided area and the core exposed area.

Comparative Example 1

In Comparative example 1, pulse lasers at the same conditions were used for the negative electrode active material provided area and for the core exposed area of the negative electrode precursor, so as to manufacture the negative electrode for lithium ion secondary battery. At first, the negative electrode precursor prepared in Comparative example 1 was the same as the negative electrode precursor prepared in Practical example 1. Then, in Comparative example 1, both of the negative electrode active material provided area and the core exposed area were cut by the pulse laser whose pulse width was 240 ns and whose lap rate was 89%. Incidentally, the frequency of the pulse laser used in Comparative example 1 was 400 kHz and the spot diameter was 30 μm.

Comparative Example 2

In Comparative example 2, CW lasers at the same conditions were used for the negative electrode active material provided area and for the core exposed area of the negative electrode precursor, so as to manufacture the negative electrode for lithium ion secondary battery. At first, the negative electrode precursor prepared in Comparative example 2 was the same as the negative electrode precursor prepared in Practical example 1 and Comparative example 1. Then, in Comparative example 2, the CW laser was used whose output was 1000 W and whose scanning speed was 6000 mm/sec. Incidentally, the spot diameter of the CW laser used in Comparative example 2 was 20 μm.

(2) Evaluation Test

Figure 16:
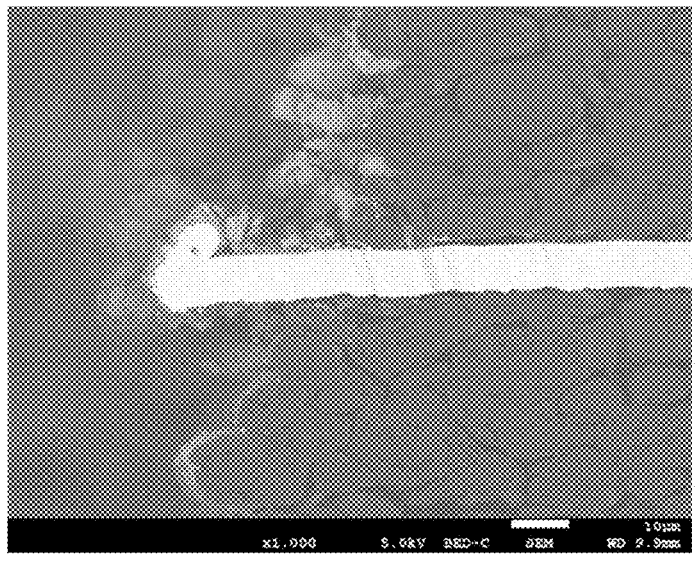
FIG. 16 is a cross section SEM photograph (1000 times) of the side edge part of the electrode plate main body part of the negative electrode plate of the practical example.
Figure 17:
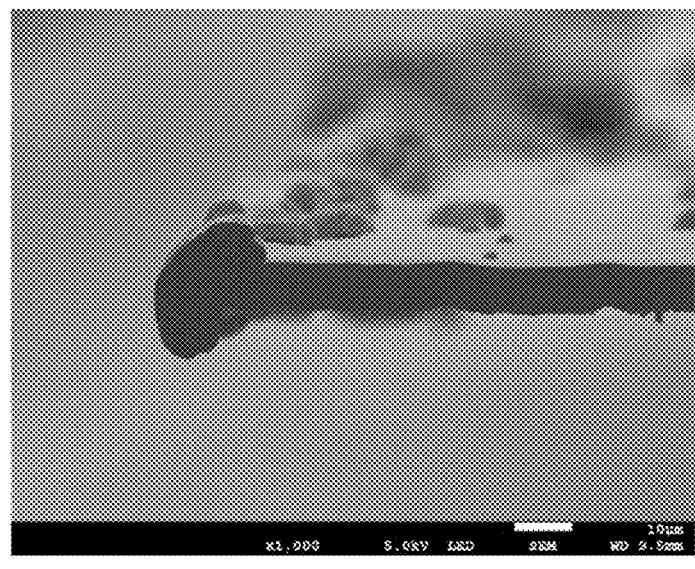
FIG. 17 is a cross section SEM photograph (1000 times) of the negative electrode tab of the negative electrode plate of Comparative example 1.
Figure 18:
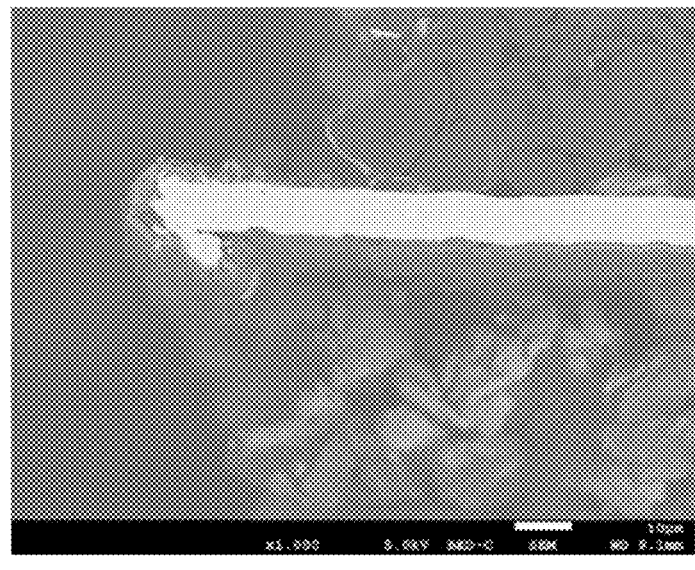
FIG. 18 is a cross section SEM photograph (1000 times) of the side edge part of the electrode plate main body part of the negative electrode plate of Comparative example 1.
Figure 19:
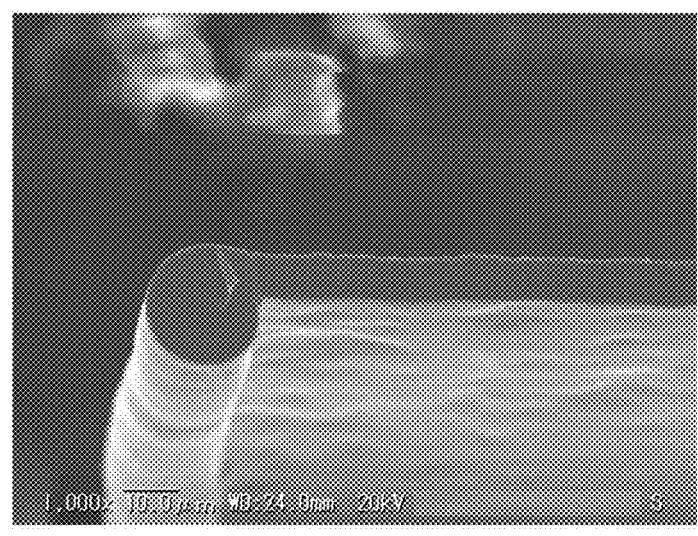
FIG. 19 is a cross section SEM photograph (1000 times) of the negative electrode tab of the negative electrode plate of Comparative example 2.
Figure 20:
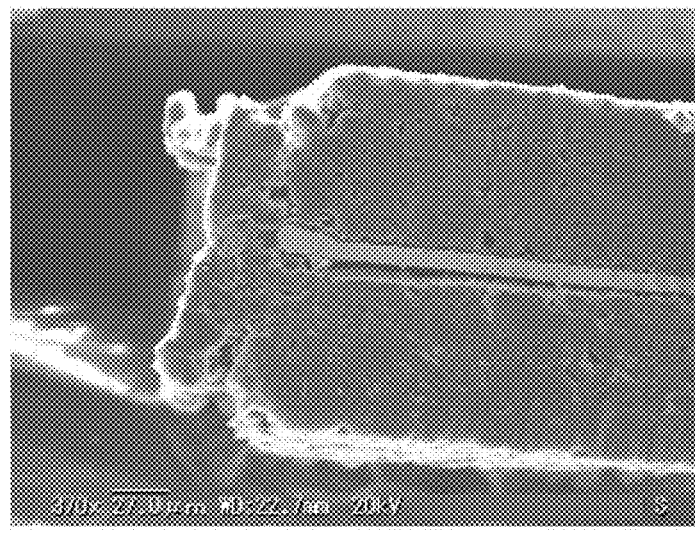
FIG. 20 is a cross section SEM photograph (370 times) of a side edge part of the electrode plate main body part of the negative electrode plate of Comparative example 2.

In the present test, at first, the laser cut portion of the negative electrode plate manufactured in each example was observed with the scanning electron microscope (SEM). Incidentally, in the present test, the SEM observation was performed on two portions of the negative electrode plate of each example, which were the side edge part of the negative electrode tab and the side edge part of the electrode plate main body. FIG. 15 is a cross section SEM photograph (1000 times) of a negative electrode tab of Practical example 1. FIG. 16 is a cross section SEM photograph (1000 times) of the electrode plate main body part of Practical example 1. FIG. 17 is a cross section SEM photograph (1000 times) of the negative electrode tab of Comparative example 1. FIG. 18 is a cross section SEM photograph (1000 times) of the electrode plate main body part of Comparative example 1. FIG. 19 is a cross section SEM photograph (1000 times) of the negative electrode tab of Comparative example 2. Then, FIG. 20 is a cross section SEM photograph (370 times) of the electrode plate main body part of Comparative example 2. From these SEM photographs shown in FIG. 15 to FIG. 20, below described points were confirmed.

At first, the state in the vicinity of the outer circumferential edge part of the negative electrode tab of each example (that is to say, in the vicinity of the core exposed area on which the laser cut was performed) is compared and examined. As shown in FIG. 15, regarding Practical example 1, no stick of the metal piece (sputter) was observed in the vicinity of the outer circumferential edge part of the negative electrode tab. In addition, at this outer circumferential edge part of the negative electrode tab, a first thick part was formed whose thickness was larger than the central part of the negative electrode tab. It is estimated that the melt negative electrode core was solidified to be this first thick part. Then, the aspect ratio of the first thick part formed at the negative electrode tab of this Practical example 1 was 0.95. On the other hand, as shown in FIG. 17, regarding Comparative example 1, a large amount of sputters were confirmed that were stuck in the vicinity of the outer circumferential edge part of the negative electrode tab. In addition, the aspect ratio of the first thick part formed at the negative electrode tab of Comparative example 1 was 0.82. Then, as shown in FIG. 19, regarding Comparative example 2, no stick of sputter was confirmed in the vicinity of the outer circumferential edge part of the negative electrode tab. In addition, the aspect ratio of the first thick part formed at the negative electrode tab of Comparative example 2 was 0.96. From these points described above, it was found that in Practical example 1 using the pulse laser whose condition is made to approximate the CW laser and in Comparative example 2 using the CW laser, generation of the sputter caused by cutting the core exposed area was suppressed and the first thick part whose cross sectional shape was approximately a round was formed at the outer circumferential edge part of the negative electrode tab. In addition, regarding Comparative example 2, the center of the first thick part whose cross section was approximately a round was deviated downward from the center in the thickness direction of the negative electrode core. It is estimated that this is caused because, regarding Comparative example 2 using the CW laser, the negative electrode tab was not completely cut off from the core exposed area at the time immediately after the laser irradiation, it was required to make the negative electrode tab be peeled off from the core exposed area, and the laser cut trace (first thick part) was pulled by peeling off the negative electrode tab.

Next, the state in the vicinity of the side edge part of the electrode plate main body part of each example (that is to say, in the vicinity of the active material layer provided area on which the laser cut was performed) is compared and examined. At first, as shown in FIG. 16, regarding Practical example 1, the second thick part, whose thickness was larger than the negative electrode core at the central part of the electrode plate main body part, was formed at the end part of the negative electrode core on the side edge part of the negative electrode plate main body part. In addition, the coating layer containing the negative electrode active material was stuck on the surface of the second thick part. In addition, as shown in FIG. 18, regarding even Comparative example 1, the second thick part was formed at the end part of the negative electrode core on the side edge part of the negative electrode plate main body part, and the coating layer containing the negative electrode active material was stuck on the surface of the second thick part. On the other hand, as shown in FIG. 20, regarding Comparative example 2, no thick part was formed at the end part of the negative electrode core. Then, on the side edge part of the electrode plate main body part of Comparative example 2, the negative electrode active material contaminated by the melt metal was stuck. Then, it was found that this negative electrode active material being stuck at the side edge part of the electrode plate main body part easily fell off and was easily peeled off in response to a small impact.

Based on the test results described above, it was found that, in order to inhibit the electrically conductive foreign substance (broken piece of the negative electrode active material layer or sputter) from falling off and being peeled off from the negative electrode plate that has been already manufactured, the pulse lasers should be used whose conditions for the negative electrode active material provided area and for the core exposed area were different when the negative electrode plate was cut out from the negative electrode precursor.

<Second Test>

In the present test, as if the case of Practical example 1 in the first test, 8 kinds of test examples were prepared for which the pulse lasers were used whose conditions were different for the negative electrode active material provided area and for the core exposed area. Then, the negative electrode plate manufactured for each test example was observed, and the conditions of the pulse laser that can suppress the generation of the sputter caused by the laser cutting on the core exposed area were examined. Below, the particular condition will be described.

(1) Sample Preparation

Test Examples 1 to 8

As described above, in the present test, 8 kinds of test examples (test examples 1 to 8) were prepared for which pulse lasers were used whose conditions were different for the negative electrode active material provided area and core exposed area of the negative electrode precursor. Incidentally, the negative electrode precursor prepared in the present test was the same as the negative electrode precursor prepared in the first test. Then, in the present test, the pulse widths and the lap rates of the pulse lasers used for cutting the core exposed area were made different between respective test examples. The conditions of the pulse lasers for respective test examples are shown in Table 1 described later.

(2) Evaluation Test

Figure 21:
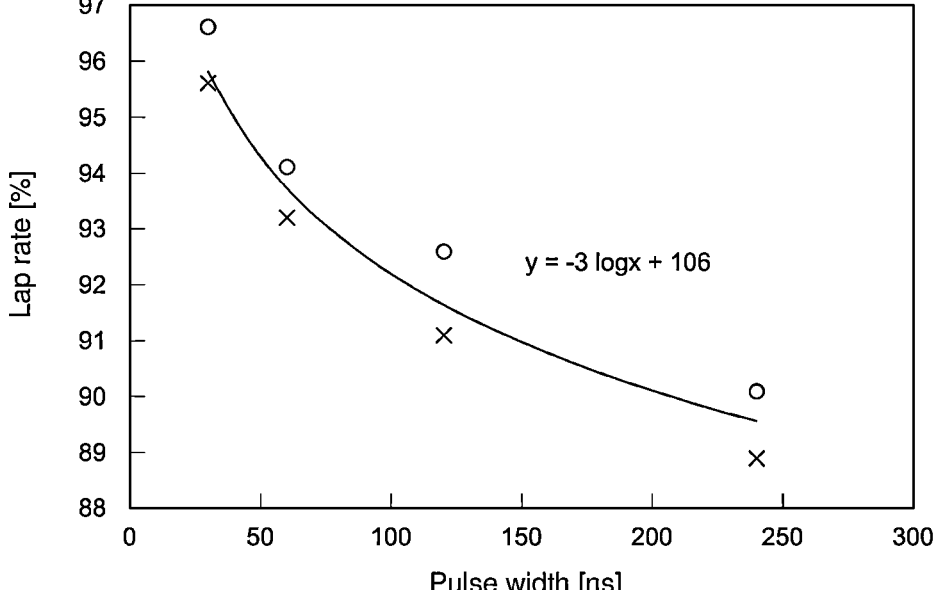
FIG. 21 is a graph that shows a relation between a lap rate and a pulse width of each sample measured at the second test.

Similarly to the first test, the cross section SEM was performed on the negative electrode plate that had been already manufactured, and the state in the vicinity of the outer circumferential edge part of the negative electrode tab was compared and examined. The result is shown in FIG. 21 and Table 1. Incidentally, "○" in FIG. 21 and Table 1 represents a test example in which no stuck sputter was confirmed by the above described SEM observation and the aspect ratio of the first thick part was equal to or more than 0.85. On the other hand, "x" represents a test example in which one or more stuck sputters were confirmed and the aspect ratio of the first thick part was less than 0.85.

TABLE 1

| | Laser irradiating condition | | | | | Evaluation test | |
| | Pulse width (ns) | Lap rate (%) | Frequency (kHz) | Average output (W) | Processing speed (mm/sec) | Aspect ratio | Comprehensive evaluation |
|---|---|---|---|---|---|---|---|
| Test example 1 | 240 | 90.1 | 450 | 210 | 1333 | 0.95 | ○ |
| Test example 2 | 240 | 88.9 | 400 | 270 | 1333 | 0.82 | x |
| Test example 3 | 120 | 92.6 | 600 | 270 | 1333 | 0.85 | ○ |
| Test example 4 | 120 | 91.1 | 500 | 270 | 1333 | 0.8 | x |
| Test example 5 | 60 | 94.1 | 750 | 270 | 1333 | 0.94 | ○ |
| Test example 6 | 60 | 93.2 | 650 | 270 | 1333 | 0.82 | x |
| Test example 7 | 30 | 96.6 | 1300 | 270 | 1333 | 0.97 | ○ |
| Test example 8 | 30 | 95.6 | 1000 | 270 | 1333 | 0.72 | x |

As shown in Table 1 and FIG. 21, in the test examples 1, 3, 5, and 7, the sputter generation was suppressed, and the first thick part whose cross section was approximately a round was formed at the end part of the negative electrode core after the cut. Then, while shown in FIG. 21, it was found that the sputter generation tended to become further easily suppressed as the lap rate of the pulse laser was larger. On the other hand, from the results of the present test, a tendency was confirmed that the sputter generation was further easily suppressed as the pulse width of the pulse laser became larger. Then, it was found that the threshold of the condition of the pulse laser, which could suppress the sputter generation, existed between the test examples 1, 3, 5, and 7 in which the sputter generation was suppressed and the test examples 2, 4, 6, and 8 in which the sputter generation was not suppressed. Based on the results of the present test, it is understood that the threshold for implementing this sputter suppression satisfies the following Formula (1).

$$Y \geq -3 \log X + 106 \qquad (1)$$

Above, the present disclosure is explained in detail, but the above described explanation is merely an illustration. In other words, the herein disclosed technique includes contents in which the above described specific examples are variously deformed or changed.

What is claim is:

1. A method for manufacturing an electrode plate that comprises an electrode core being a metal foil and an electrode active material layer being provided on a surface of the electrode core and having an electrode active material, the method comprising:
   a precursor preparing step for preparing an electrode precursor that comprises an active material provided area in which the electrode active material layer is provided on a surface of the electrode core and comprises a core exposed area in which the electrode core is exposed while the electrode active material layer is not provided;
   an active material provided area cutting step for cutting the active material provided area by a pulse laser; and
   a core exposed area cutting step for cutting the core exposed area by the pulse laser, wherein,
   in a case where a pulse width (ns) and a lap rate (%) of the pulse laser are respectively represented by X and Y for the core exposed area cutting step, a formula of $Y \geq -3 \ln (X) + 106$ is satisfied.

2. The method for manufacturing the electrode plate according to claim 1, wherein
   a frequency of the pulse laser in the active material provided area cutting step is lower than a frequency of the pulse laser in the core exposed area cutting step.

3. The method for manufacturing the electrode plate according to claim 1, wherein
   a frequency of the pulse laser in the active material provided area cutting step ranges from 100 kHz to 2000 KHz.

4. The method for manufacturing the electrode plate according to claim 1, wherein
   the pulse width X of the pulse laser in the core exposed area cutting step ranges from 30 ns to 240 ns.

5. The method for manufacturing the electrode plate according to claim 1, wherein
   a lap rate Y of the pulse laser in the active material provided area cutting step is smaller than a lap rate Y of the pulse laser in the core exposed area cutting step.

6. The method for manufacturing the electrode plate according to claim 1, wherein
   the lap rate Y of the pulse laser in the core exposed area cutting step ranges from 90% to 99%.

7. The method for manufacturing the electrode plate according to claim 1, wherein
   the electrode plate is a negative electrode plate that comprises a negative electrode core made of a copper or a copper alloy, and a negative electrode active material layer comprising a carbon material as the electrode active material.

8. A manufacturing method of a secondary battery provided with an electrode body in which a pair of electrode plates are opposed to each other through a separator, wherein
   the manufacturing method of the electrode plate according to claim 1 is used to manufacture at least one of the pair of electrode plates.

* * * * *